(12) United States Patent
Froy et al.

(10) Patent No.: US 11,875,637 B2
(45) Date of Patent: Jan. 16, 2024

(54) SELF-EVOLVING AI-BASED PLAYSTYLE MODELS

(71) Applicant: IGT, Las Vegas, NV (US)

(72) Inventors: David Froy, Lakeville-Westmorland (CA); Thomas Trenkler, Thal bei Graz (AT); Karen Van Niekerk, Dieppe (CA); Michael Russ, Graz (AT); David Small, Moncton (CA)

(73) Assignee: IGT, Las Vegas, NV (US)

( * ) Notice: Subject to any disclaimer, the term of this patent is extended or adjusted under 35 U.S.C. 154(b) by 115 days.

(21) Appl. No.: 17/537,054

(22) Filed: Nov. 29, 2021

(65) Prior Publication Data

US 2023/0169823 A1    Jun. 1, 2023

(51) Int. Cl.
*G07F 17/32* (2006.01)
*G06N 3/12* (2023.01)

(52) U.S. Cl.
CPC ........... *G07F 17/3227* (2013.01); *G06N 3/12* (2013.01); *G07F 17/323* (2013.01); *G07F 17/3206* (2013.01); *G07F 17/3237* (2013.01)

(58) Field of Classification Search
CPC ............. G07F 17/3227; G07F 17/3206; G07F 17/323; G07F 17/3237; G06N 3/12
See application file for complete search history.

(56) References Cited

U.S. PATENT DOCUMENTS

| | | | |
|---|---|---|---|
| 8,147,334 B2 | 4/2012 | Gatto et al. | |
| 8,556,706 B2 | 10/2013 | Barney et al. | |
| 8,764,566 B2 | 7/2014 | Miltenberger et al. | |
| 8,998,694 B2 | 4/2015 | Rowe | |
| 9,454,872 B2 | 9/2016 | Muir et al. | |
| 10,699,523 B2 | 6/2020 | Digiovanni | |
| 10,828,566 B2 * | 11/2020 | Krishnamurthy | ....... A63F 13/67 |
| 2015/0126268 A1 * | 5/2015 | Keilwert | ............. G07F 17/3206 463/23 |
| 2016/0379511 A1 * | 12/2016 | Dawson | ................ G06T 11/206 434/362 |

OTHER PUBLICATIONS

Weber "The Zynga Analytics Platform in 2020," Game Developer, Oct. 26, 2020, 7 pages [retrieved online from: www.gamedeveloper.com/disciplines/the-zynga-analytics-platform-in- 2020].

* cited by examiner

*Primary Examiner* — Kevin Y Kim

(74) *Attorney, Agent, or Firm* — Sheridan Ross P.C.

(57) ABSTRACT

The present disclosure relates generally to a gaming system, device, and method supportive of a self-evolving, AI-based playstyle models. A gaming system, device, and method are provided that identify data associated with a gameplay session at a gaming device, provide the data to a machine learning network; receive an output from the machine learning network in response to the machine learning network processing the data using a playstyle model, the output including an indication associated with modifying the playstyle model; and modify the playstyle model based on the indication. The data includes at least one of: a gameplay decision received during the gameplay session; and an emotional state of a user in association with the gameplay decision.

19 Claims, 5 Drawing Sheets

SELF-EVOLVING AI-BASED PLAYSTYLE MODELS

BACKGROUND

The present disclosure is generally directed toward gaming devices and systems and, more specifically, self-evolving, artificial intelligence (AI)-based playstyle models.

In some gaming systems, an EGM may include an auto play mode which, when activated, may repeatedly implement plays (e.g., spins) at the EGM based on current wager settings without manual intervention by a player.

BRIEF SUMMARY

In certain aspects, the present disclosure relates to a gaming system, device, and method supportive of self-evolving, AI-based playstyle models. Aspects of the present disclosure also relate to providing self-evolving, AI-based playstyle models that are based on behavioral shifts and/or emotional states of a player.

A gaming system is provided that includes a communication interface; a processor coupled with the communication interface; and a computer-readable storage medium coupled with the processor, the computer-readable storage medium including processor-executable instructions that, when executed by the processor, cause the processor to identify data associated with a gameplay session at a gaming device, the data including at least one of: a gameplay decision received during the gameplay session; and an emotional state of a user in association with the gameplay decision. In some aspects, the instructions are further executable by the processor to: provide the data to a machine learning network; receive an output from the machine learning network in response to the machine learning network processing the data using a playstyle model, the output including an indication associated with modifying the playstyle model; and modify the playstyle model based on the indication.

A device is provided that includes: a communication interface; a processor coupled with the communication interface; and a computer-readable storage medium coupled with the processor, the computer-readable storage medium including processor-executable instructions that, when executed by the processor, cause the processor to: identify data associated with a gameplay session at a gaming device, the data including at least one of: a gameplay decision received during the gameplay session; and an emotional state of a user in association with the gameplay decision. In some aspects, the instructions are further executable by the processor to: provide the data to a machine learning network; receive an output from the machine learning network in response to the machine learning network processing the data using a playstyle model, the output including an indication associated with modifying the playstyle model; and modify the playstyle model based on the indication.

A method is provided that includes: identifying data associated with a gameplay session at a gaming device, the data including at least one of: a gameplay decision received during the gameplay session; and an emotional state of a user in association with the gameplay decision. In some aspects, the method further includes providing the data to a machine learning network; receiving an output from the machine learning network in response to the machine learning network processing the data using a playstyle model, the output including an indication associated with modifying the playstyle model; and modifying the playstyle model based on the indication. Additional features and advantages are described herein and will be apparent from the following Description and the figures.

DETAILED DESCRIPTION

Figure 1:
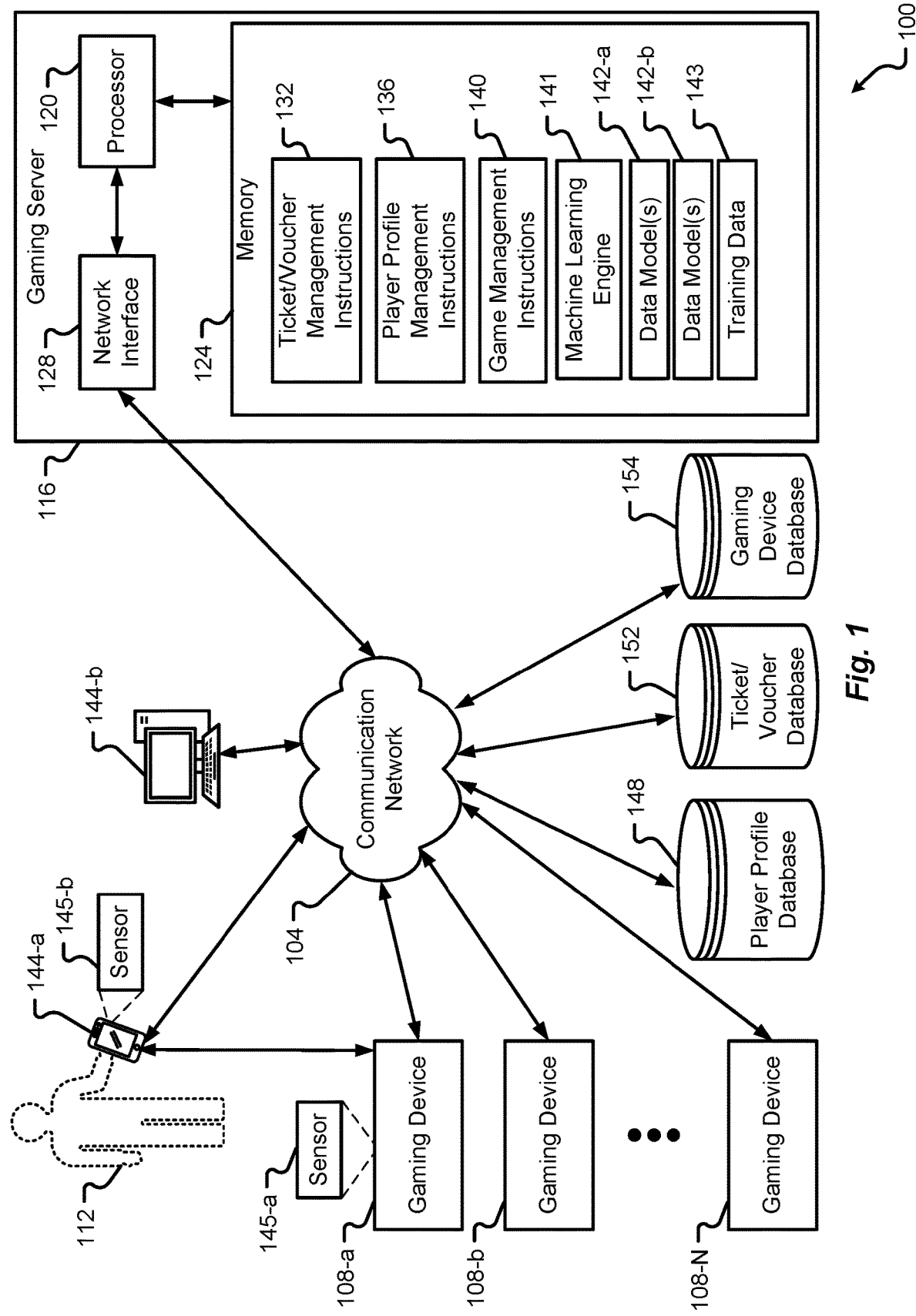
FIG. 1 is a block diagram of a gaming system in accordance with aspects of the present disclosure.

Aspects of the present disclosure will be described in connection with self-evolving, artificial intelligence (AI)-based playstyle models (also referred to as self-learning, AI-based playstyle models) in an environment such as, for example, a casino environment. While some examples in the present disclosure may reference the use of an Electronic Gaming Machine (EGM) as a gaming device via which players may participate in gaming activity, it should be appreciated that aspects of the present disclosure are not so limited. For example, any computing device, personal gaming device, or collection of computing devices may be used to facilitate invoking and implementation of self-evolving AI-based playstyle models.

In some gaming environments (e.g., casino environments), an EGM may include a playstyle model (e.g., a gameplay assistant, a gameplay model, a player companion, etc.) which, when activated during a gameplay session at the EGM, may assist the player and/or server as a personalization enabler. However, in some other implementations of playstyle models, the playstyle models are hard-coded and created with either common player traits (e.g., generic behaviors, personalities, etc.) and/or are based upon a relatively limited number of parameters. Such playstyle models, however, lack in behaving "intelligently" (e.g., in more complex gameplay situations) in supporting user-tailored experiences. For example, in some systems, such playstyle models are not fed with additional data (e.g., feedback, gameplay data, etc.) and are unable to evolve beyond a base model. In some cases, the playstyle models are incapable of drawing on self-learning implications.

Aspects of the present disclosure provide enhancements to using playstyle models in a casino environment (e.g., associated with EGMs) in which the playstyle models are capable of self-evolving (also referred to herein as self-learning) based on gameplay decisions, gameplay outcomes, and other player related parameters (e.g., behavioral shifts in gameplay decisions, biometric data, calculated and/or predicted emotional states, etc.). For example, a gameplay system may support initial training and creation of a baseline model, in which the baseline model is associated to a player. The system may continuously feed the model with player data (e.g., gameplay decisions, behavioral shifts, button inputs, etc.) generated by the player in association with a gameplay session, in addition to other player-related parameters (e.g., measured biometric data, emotional states calculated and/or predicted based on the biometric data, etc.) associated with the gameplay session. In some aspects, via AI mechanisms, the model may self-evolve to enhance itself on order to optimize the gaming experience for the player. Aspects of the present disclosure describe example techniques associated with generating such playstyle models, example methods of implementing the playstyle models in a gameplay environment (e.g., casino environment), examples of modifying the playstyle models, and example use-cases thereof.

For example, aspects of the present disclosure support the creation and application of "intelligent," self-learning models. In an example, the models described herein may support learning or evolving based on multiple different input sources (e.g., player data, player-related parameters, etc.) to increase the complexity and range of functionality of the models. Accordingly, for example, the models may serve as an intelligent companion capable of assisting players in complex situations while addressing player personal preferences of the players. In some aspects, such features may ultimately result in increased player satisfaction, an increase in gameplay sessions at a gaming device (e.g., returning to a gaming device for subsequent gameplay sessions), and increased gameplay duration at a gaming device (e.g., spending a longer amount of time at a gaming device due to preference and/or user convenience regarding the model's support).

According to example aspects of the present disclosure, a gaming server (and/or a gaming device) may track player decisions in all game situations (e.g., gameplay decisions with respect to decision events such as gameplay choices, slot pulls, bonus selections, etc.). For example, the gaming server may log the player decisions and provide (e.g., using a machine learning engine, also referred to herein as a machine learning network) real-time analysis with respect to the layer decisions. In some aspects, using the machine learning engine, the gaming server may provide recommendations based on a data that is relatively larger and higher in complexity compared to data analysis in some other systems. For example, aspects of the present disclosure support machine learning recommendations that provide analysis beyond "simple" mathematical calculations implemented in some techniques which focus only on pure data analysis.

Aspects of the present disclosure may support output-learnings. For example, the gaming server (e.g., using a machine learning network and a playstyle model, etc.) may compare an action (e.g., a new gameplay decision by a player, a new gameplay entry, etc.) to previous actions and/or decisions (also referred to herein as historical actions and/or historical decisions) by the player. In an example, the gaming server may determine that there is a match between the action and a previous action. For example, the gaming server may determine that the action is the same as a previous decision(s) (or similar to the previous decision(s) with respect to a threshold) under similar gameplay conditions. In some aspects, the gaming server may determine that there is a match between the action (e.g., gameplay decision) and an action (e.g., a gameplay decision) predicted by the gaming server. The gaming server may add the action to a history of previous gameplay decisions (also referred to herein as historical recordings) so as to establish and/or verify accuracy of an applied playstyle model with respect to the action. The history may be implemented at a database, a memory, or the like.

Additionally, or alternatively, the gaming server may determine that there is not a match between the action and a previous action. For example, the gaming server may determine the action is the different from a previous decision(s) under similar gameplay conditions, the action exceeds a similarity threshold with respect to the previous decision(s), the action is different from and/or exceeds the similarity threshold with respect to a decision predicted by the gaming server, etc. The gaming server (e.g., using a machine learning engine) may apply learning techniques associated with identifying the reason of the mismatch. For example, the gaming server may identify whether the mismatch is a result of a spontaneous or non-rational decision by the player, a general behavioral shift of the player (e.g., as determined using gameplay data, biometric data, and/or an emotion prediction engine of the system, aspects of which are described later herein), etc.

In some aspects, the gaming server may identify behavioral changes (e.g., potential new behaviors, behavioral shifts, etc.) associated with the player, and the gaming server may modify the playstyle model based on the behavioral changes. That is, for example, the gaming server may modify the playstyle model to account for different emotional states of the player when providing recommended actions (e.g., gameplay recommendations, non-gameplay recommendations, etc.).

In some aspects, the analysis by the gaming server (e.g., by the machine learning network, playstyle model, etc.) may be handled invisible to a player. A player may also be referred to herein as a customer. Aspects of the present disclosure support evolving a playstyle model based on player decisions (e.g., new gameplay decisions), and the gaming server may provide recommended actions based on the evolution of the playstyle model. Accordingly, for example, the gaming server may provide an "intelligent" recommender companion capable of providing recommendations that change or evolve with the player.

Aspects of the present disclosure may provide explicit improvements through AI. For example, systems described herein may support more accurate recommendations (e.g., gameplay recommendations, etc.) and/or predictions of decisions (e.g., predicted player decisions) based on a huge number of historical player behavior data. In some aspects, multiple thousands (e.g., millions) of historical decisions may be incorporated into a playstyle model(s) described herein. Aspects of the present disclosure support modifying (e.g., changing, adjusting) the playstyle model(s) over time, based on single decisions made (e.g., per each instance of a gameplay decision, an associated emotional state of a player, etc.). Example techniques described herein may provide reduced processing overhead (e.g., computing power, calculation time, etc.) compared to other techniques that analyze all single entries of historical data and compare the entries against new data, instead of using an AI model.

Example aspects of the present disclosure may provide increased gaming experience for players (e.g., utilizing playstyle-based models) by providing more variety and aiming for more player excitement. In some examples, incorporation of such playstyle-based models may provide increased player engagement created via utilized playstyle-based gaming, which may support higher revenue (e.g., at a casino venue). Aspects of the present disclosure described herein support monitoring of player attitudes (e.g., emotional states) to create a "wow-effect" for players.

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a system according to embodiments of the present disclosure may include one, some, or all of the components depicted in the gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure.

The gaming system 100 may include a communication network 104 that interconnects and facilitates machine-to-machine communications between one or multiple gaming devices 108 (e.g., any of gaming device 108-a through 108-N) and a gaming server 116. It should be appreciated that the communication network 104 may correspond to one or many communication networks without departing from the scope of the present disclosure. In some embodiments, gaming device 108-a through gaming device 108-N and gaming server(s) 116 may be configured to communicate using various nodes or components of the communication network 104. The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

In some embodiments, the gaming devices 108 (e.g., gaming device 108-a through gaming device 108-N) may be distributed throughout a single property or premises (e.g., a single casino floor), or the gaming devices 108 (e.g., gaming device 108-a through gaming device 108-N) may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-a through gaming device 108-N) may utilize the same or different types of communication protocols to connect with the communication network 104. It should also be appreciated that the gaming devices 108 (e.g., gaming device 108-a through gaming device 108-N) may present the same type of game or different types of games to a player 112. For example, the gaming device 108-a may correspond to a gaming machine that presents a slot game to the player 112, the gaming device 108-b may correspond to a video poker machine, and other gaming devices 108 may present other types of games (e.g., keno, sports wagering, etc.) or a plurality of different games for selection and eventual play by the player 112.

In some aspects, some of the gaming devices 108 (e.g., gaming device 108-a through gaming device 108-N) may communicate or exchange data with one another via the communication network 104. In some embodiments, one or more of the gaming devices 108 may be configured to communicate directly with a centralized management server and/or the gaming server 116. Although not depicted, the gaming system 100 may include a separate server or collection of servers that are responsible for managing the operation of the various gaming devices 108 in the gaming system 100.

It should also be appreciated that the gaming server 116 may or may not be co-located with one or more gaming devices in the same property or premises. Thus, one or more gaming devices may communicate with the gaming server 116 over a WAN, such as the Internet. In such an event, a tunneling protocol or Virtual Private Network (VPN) may be established over a portion of the communication network 104 to ensure that communications between an EGM and the server 116 (e.g., a remotely-located server) are secured.

The gaming devices 108 (e.g., gaming device 108-a through gaming device 108-N) may correspond to a type of device that supports interaction by a player 112 in connection with playing games of chance. Examples of a gaming device 108 may include any type of known gaming device such as an EGM, a slot machine, a table game, an electronic table game (e.g., video poker), a skill-based game, etc. In addition to playing games on a gaming device 108, the player 112 may also be allowed to interact with and play games of chance on a communication device 144.

The gaming system 100 may support interaction with one or more communication devices 144. A communication device 144 (e.g., communication device 144-a) may be a mobile device of a player 112 (e.g., a personal communication device such as a smart phone, a tablet, a smart watch, etc.) or to a device issued by a casino to the player 112. It should be appreciated that the player 112 may play games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device 144 (e.g., communication device 144-*b*) may be a mobile device, a PC, or the like of a casino operator (e.g., a floor attendant, a casino manager, etc.).

In some cases, the gaming system 100 may support "carding in" of a player at a gaming device 108 with a physical card (e.g., a player club card). In other cases, the gaming system 100 may support "carding in" of a player at a gaming device 108 via a mobile application on a communication device 144. In some aspects, the mobile application may support fund transfers between a player account and the gaming device 108 (e.g., a server, the casino). For example, using the mobile application, the player may transfer funds to a gaming session.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the server, and/or the gaming system. The gaming server 116 (or the gaming device 108) may establish a gaming session at the gaming device 108 for the player based on the information provided during the "card in."

The gaming server 116 is further shown to include a processor 120, a memory 124, and a network interface 128. These resources may enable functionality of the gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data to and retrieve data from a player profile database 148, a ticket/voucher database 152, and/or a gaming device database 154.

Alternatively or additionally, the player profile database 148 or data stored thereon may be stored internal to the any of the communication device 144, a gaming device 108, and/or the server 116 (e.g., within the memory 124 of the server 116 rather than in a separate database). Alternatively or additionally, the ticket/voucher database 152 or data stored therein may be stored internal to the server 116. Alternatively or additionally, the gaming device database 154 or data stored thereon may be stored internal to the server 116.

The databases described herein (e.g., player profile database 148, ticket/voucher database 152, gaming device database 154) may include a relational database, a centralized database, a distributed database, an operational database, a hierarchical database, a network database, an object-oriented database, a graph database, a NoSQL (non-relational) database, etc. In some aspects, the databases may store and provide access to, for example, any of the stored data described herein.

In some aspects, the gaming system 100 may be implemented using a fully software-based solution. In some other aspects, the gaming system 100 may be implemented using a combination of software and hardware accelerators for offloading AI processing tasks and/or AI data handled at the gaming system 100. Aspects of the present disclosure and solutions thereof may be used locally at an EGM (e.g., a gaming device 108), a local server (e.g., gaming server 116 or a different server), and/or on a cloud server (e.g., gaming server 116 or a different server). Example processors (also referred to herein as co-processors) usable for offloading the AI processing tasks and/or AI data may include any combination of GPUs, ASICs, FPGAs, or the like. In some aspects, the processors (e.g., co-processors) may be located at a gaming device 108 and/or the gaming server 116. In some other aspects, processors (e.g., co-processors) located at a communication device 144 (e.g., a cellular phone, a smart phone, a tablet, a wearable device, an augmented reality headset, a virtual reality headset, etc.) may be used for offloading the AI processing tasks and/or AI data.

The gaming server 116 may support example aspects described herein of acquiring sensor data associated with a gameplay session using any combination of sensors 145 (e.g., sensor 145-*a*, sensor 145-*b*, etc.) (also referred to herein as sensor devices). The sensors 145 may be implemented at (e.g., integrated in) any combination of gaming devices 108 and/or communication devices 144. In some aspects, the sensors 145 may be standalone devices capable of communicating with any component (e.g., a gaming device 108, a gaming system 100, a database, etc.) of the gaming system 100, for example, via the communication network 104. In some aspects, the sensors 145 may provide the sensor data to a machine learning engine 141, aspects of which are described later herein.

In some aspects, the sensors 145 may include any combination of: an image sensor, an eye tracking sensor, a heart rate sensor, an infrared sensor, an audio sensor (e.g., a microphone), a pulse sensor, an oxygen sensor, a temperature sensor, a pressure sensor (e.g., integrated within a button, a keypad, etc.), a touch screen sensor, a vibration sensor, a motion sensor, an accelerometer, or the like. In some cases, the sensors 145 may be integrated within a physical interface of a gaming device 108 or a communication device 144. In some cases, the sensors 145 may be integrated at or within a threshold distance of a gaming device 108. For example, the sensors 145 may be integrated with a seat cushion, an arm rest, a seat back, a pull handle, a "spin" button, etc.

In some examples, the sensors 145 may capture or measure biometric data (e.g., facial features, facial response, eye movement, pupil dilation, heart rate, temperature, pulse, speech or speech patterns, breathing pattern, etc.) of a player with respect to a decision event, a gameplay decision, and/or a gameplay result in association with a gameplay session. The sensors 145 may detect changes and/or patterns in biometric data in association with a decision event, a gameplay decision, and/or a gameplay result in association with a gameplay session. In some aspects, the sensors 145 may include smart sensors capable of scanning and/or measuring a player's biometric parameters such as pulse, breathing rate, heart rate, eye focus, body movement, attention, electroencephalogram (EEG) parameters (e.g., electrical activity of the brain), electrocardiogram (ECG or EKG) parameters (e.g., heard rhythm and electrical activity), voice, speech pattern, etc.

In some other examples, the sensors 145 may capture or measure a value (e.g., force, velocity, etc.) corresponding to physical inputs (e.g., button presses, etc.) by the player at a gaming device 108 in association with a decision event, a gameplay decision, and/or a gameplay result in association with a gameplay session. For example, a sensor 145 (e.g., sensor 145-a) at a gaming device 108 (e.g., gaming device 108-a) may be a pressure sensor integrated within a button (e.g., a "spin" button, a "bet" button, etc.) at the gaming device 108, and the sensor 145 may capture or measure a value indicating a force at which the player presses the button.

Aspects of the present disclosure support providing the sensor data (e.g., biometric data, value corresponding to a physical input, etc.) to the machine learning engine 141. The machine learning engine 141 may use the sensor data to predict emotional states of the player, example aspects of which are later described herein. For example, the sensors 145 may capture (e.g., repeatedly, according to a temporal interval, in association with each decision event, gameplay decision, gameplay result, etc.) sensor data associated with a player during a gameplay session and provide the same to the machine learning engine 141. Using the sensor data, for example, the machine learning engine 141 may determine emotional thresholds (e.g., level of satisfaction, excitement, happiness, etc.) associated with the player and/or predict emotional states associated with the player.

The illustrative instruction sets that may be stored in memory 124 include, without limitation, a ticket/voucher management instruction set 132, a player profile management instruction set 136, and a game management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the ticket/voucher management instruction set 132, when executed by the processor 120, may enable the gaming server 116 to manage various tickets/vouchers issued by gaming devices 108 (e.g., gaming device 108-a through gaming device 108-N), manage ticket/voucher values, determine ticket/voucher states, update the ticket/voucher database 152, obtain information from the ticket/voucher database 152, determine that a ticket/voucher has been redeemed and notify the player profile management instruction set 136, etc. In embodiments where the ticket/voucher instruction set 132 is implemented in one system (e.g., a ticketing/voucher system) and the player profile management instruction set 136 is implemented in a separate system (e.g., a player tracking system), a communication link may or may not be implemented between the two systems. In such a situation, the tickets/vouchers issued by the ticketing/voucher system may be anonymous and not necessarily associated with any particular player or player profile.

In some embodiments, the ticket/voucher management instruction set 132 may be configured to perform any action consistent with the issuance of tickets/vouchers, tracking of ticket/voucher states, and determining whether/when/where a ticket/voucher has been redeemed. In some embodiments, the ticket/voucher management instruction set 132 may be configured to generate, or cause the game management instruction set 140 to generate, a synthesized credit meter for the first gaming device. For example, as gaming devices 108 (e.g., gaming device 108-a through gaming device 108-N) or a communication device 144 have their credit meters updated, the gaming server 116 may update a corresponding synthesized credit meter to reflect updates at the credit meters. In some embodiments, values of credit or other events stored in credit meters of gaming device 108 and/or a communication device 144 may be mirrored in a synthesized credit meter maintained by the gaming server 116.

The player profile management instruction set 136, when executed by the processor 120, may enable the gaming server 116 to manage one or more player profiles within the player profile database 148. In some embodiments, the player profile management instruction set 136 may be configured to manage a player loyalty profile including settings for such player profiles, available wager credits for such profiles, determine player wager history, and/or determine which, if any, tickets/vouchers are associated with a particular player. It should also be appreciated that the player profile management instruction set 136 may be configured to manage player profiles of players that do not have loyalty accounts or any other predetermined player account.

In some aspects, the player profile management instruction set 136 may be configured to manage a player history associated with gameplay sessions. In an example, the player history may include user behavior (e.g., gameplay decisions) associated with previous and/or current gameplay sessions. In some other examples, the player history may include instances of auto play modes enabled on behalf of the player (e.g., instances in which the gaming server 116 made an auto play mode available for selection by a player).

For example, the player history may include playstyle models selected (e.g., by the gaming server 116, by the player, etc.) for an auto play mode. In some other examples, the player history may include instances of invoking (e.g., by the gaming server 116, by the player) auto play modes on behalf of the player. In some other examples, the player history may include instances of ending or pausing (e.g., by the gaming server 116, by the player) an active auto play mode. The player history may include gameplay decisions (e.g., proposed gameplay decisions based on a playstyle model, user decisions based on the proposed gameplay decisions, etc.) associated with an invoked auto play mode. In some aspects, in accordance with an invoked auto play mode, the gaming server 116, gaming devices 108 and/or communication device 144 may automatically apply gameplay decisions (e.g., proposed gameplay decisions) on behalf of the player.

In some examples, the player history may include instances of sensor data (e.g., biometric data, pressure sensor data, etc.) and/or emotional states of a player with respect to a gameplay session. For example, the player history may include emotional states (e.g., as calculated based on the sensor data) with respect to decision events, gameplay decisions, and/or gameplay results in association with any gameplay session. The sensor data may be measured and/or emotional states may be calculated in real-time by the machine learning engine 141 in association with a gameplay session (e.g., a decision event, a gameplay decision, a gameplay result, etc.). Additionally, or alternatively, the sensor data may be collected and/or the emotional states may be calculated following the completion of a gameplay session.

In some aspects, the machine learning engine 141 may use a data model 142 (e.g., data model 142-b, also referred to herein as an emotion model or emotion prediction model) configured to calculate or predict an emotional state(s) of a player with respect to different decision events, gameplay decisions, gameplay results, gameplay durations, etc. For example, the machine learning engine 141 may use the data model 142-b to calculate or predict the emotional state(s), using gameplay data (e.g., decision events, gameplay decisions, gameplay results, etc.) and sensor data (e.g., biometric data, pressure sensor data, etc.).

In some aspects, the machine learning engine 141 may feed the predicted emotional state(s) to another data model 142 (e.g., data model 142-a, a playstyle model described herein). The machine learning engine 141 may generate, train, retrain, and/or modify the data model 142-a using outputs from the data model 142-a, outputs from the data model 142-b, sensor data, and/or gameplay data described herein.

The game management instruction set 140, when executed by the processor 120, may enable the gaming server 116 to manage the various games played by a player 112 at the gaming devices 108 (e.g., gaming device 108-a through gaming device 108-N) and/or a communication device 144 carried by the player 112. For example, any game played by the player 112 at any of the gaming devices 108 and/or communication device 144 may be managed, partially or entirely, by execution of the game management instruction set 140. The game management instruction set 140 may also be configured to track a status of wager events (e.g., non-EGM wager games, sporting events, bingo, keno, lottery, etc.) and whether a player 112 has placed a wager on such events. In some embodiments, when a wager event has come to completion such that wagers made on the event become payable (e.g., at the end of a gameplay decision at a gaming device 108 and/or communication device 144, at the end of a sporting event when the final score of the event is determined), the game management instruction set 140 may notify the ticket/voucher management instruction set 132, thereby enabling the ticket/voucher management instruction set 132 to update states and/or values of tickets/vouchers issued for the event appropriately.

In some aspects, the game management instruction set 140, when executed by the processor 120, may enable the gaming server 116 to manage and/or monitor data associated with a gameplay session at a gaming device 108. For example, the gaming server 116 may support example aspects described herein of monitoring user information (e.g., member identification information, player club status, etc.), gameplay data (e.g., quantity of plays, quantity of spins, duration of gameplay, credits spent, credits earned, etc.), and gameplay mode information (e.g., current gameplay mode, playstyle model applied to the gameplay mode, etc.) associated with a gameplay session at the gaming device 108. The gaming server 116 may update the gaming device database 154, obtain information from the gaming device database 154, determine gaming devices 108 that are in auto play mode, and notify the game management instruction set 140, etc.

In an example, the gaming server 116 may support example aspects described herein of identifying historical data (e.g., previous gameplay decisions) associated with previous gameplay sessions at gaming devices 108. In another example, the gaming server 116 may support example aspects described herein of identifying current data (e.g., gameplay decisions) associated with a current gameplay session at a gaming device 108. The gaming server 116 may provide any of the historical data and/or current data to a machine learning engine 141 (e.g., as inputs to a data model(s) 142, as training data 143, etc.), example aspects of which are described herein. In some aspects, gameplay decisions may be associated with decision events such as wager selections, gameplay choices (e.g., a player decision in a video poker game, selected pay lines at a slot machine, etc.), bonus/prize selections, etc.

In some aspects, the historical data may include sensor data associated with previous gameplay sessions (e.g., sensor data associated with previous gameplay decisions, previous decision events, previous gameplay results, etc.). The historical data may include previous emotional states calculated and/or predicted (e.g., by the machine learning engine 141, using the data model 142-b, etc.) based on the sensor data. In some aspects, the current data may include sensor data associated with current gameplay sessions (e.g., sensor data associated with current gameplay decisions, current decision events, current gameplay results, etc.). The current data may include current emotional states calculated and/or predicted (e.g., by the machine learning engine 141, using the data model 142-b, etc.) based on the sensor data.

In some examples, the game management instruction set 140 may enable the gaming server 116 to manage gameplay modes (e.g., auto play modes) of gaming devices 108. In an example, the gaming server 116 may support example aspects described herein of enabling a gameplay mode (e.g., an auto play mode) in which a playstyle model(s) is utilized to provide automated player inputs to a gameplay session at a gaming device 108. In an example, the gaming server 116 may enable a fully-autonomous auto play mode at a gaming device 108. That is, for example, the gaming server 116, a gaming device 108, and/or a communication device 108 may autonomously generate, select, and/or apply playstyle models (e.g., propose and/or implement gameplay decisions) described herein. In some other examples, the gaming server 116 may enable a semi-autonomous auto play mode at a gaming device 108.

In some aspects, the gaming server 116 may support enabling a gameplay mode (e.g., an auto play mode) using a baseline model described herein. The baseline model may be, for example, a baseline playstyle model. In some aspects, the data model 142-a may be an example of a baseline model. In some other aspects, the gaming server 116 may support enabling a gameplay mode using on a self-evolved model (e.g., an evolved or updated version of the baseline model) described herein.

The gaming server 116 may support example aspects described herein of outputting notifications associated with a gameplay mode. For example, the gaming server 116 may output notifications indicating whether an auto play mode is available to the player, an indication of the auto play mode (e.g., whether the auto play mode has been invoked and/or ended), an indication of a playstyle model applied to the auto play mode, etc. In some examples, for an auto play mode applied to a gameplay session, the gaming server 116 may output notifications indicating predicted gameplay parameters associated with a playstyle model applied to the auto play mode. In an example, the predicted gameplay parameters may include a predicted gameplay duration (e.g., amount of time until gameplay credits are exhausted) associated with the playstyle model, a predicted risk factor (e.g., risk level) associated with the playstyle model, average gameplay credits spent over a time period when applying the playstyle model, and/or a recommendation of how much money to insert to secure a desired amount of time at a gaming device 108.

In some aspects, the gaming server 116 may output notifications indicating a recommended action for improving an emotional state of the player. For example, a notification may include a recommendation to pause or terminate a gameplay session (e.g., a recommendation to take a break). In another example, a notification may include a proposed game type associated with a gameplay session or proposed game type associated with a different gameplay session (e.g., a recommendation to play a different game type) and/or a ranking associated with the proposed game type. In some examples, a notification may include a proposed gaming device associated with a gameplay session or a different gameplay session (e.g., a recommendation to play at a different gaming device 108) and/or a ranking associated with the proposed gaming device. In some other examples, a notification may include a proposed incentive (e.g., a bonus, a free offering by a casino venue, etc.) associated with the player, a gameplay session, or both.

According to example aspects of the present disclosure, the processor 120 may utilize data stored in the memory 124 as a neural network. The neural network may be, for example, a machine learning network and may include a machine learning architecture. In some aspects, the neural network may be or include an artificial neural network (ANN). In some other aspects, the neural network may be or include any machine learning network such as, for example, a deep learning network, a convolutional neural network, a long-short term memory (LSTM) neural network, or the like. Some or all of instructions or instruction sets stored in the memory 125 and some functions of the gaming server 116, gaming devices 108, and/or communication devices 144 may be implemented using machine learning techniques. In some cases, the machine learning techniques may include deep learning and reinforcement learning. Aspects of the present disclosure support modifying any portion of the neural network over time based on gameplay data (e.g., gameplay decisions, gameplay results, player behavior, etc.), sensor data (e.g., biometric data, etc.), predicted and/or calculated emotional states of a player, player feedback (e.g., a questionnaire, etc.), etc. as described herein.

In some aspects, the neural network may support various clustering algorithms. For example, the neural network may support K-means clustering of training data 143. For example, the training data 143 may include gameplay data and player behavior (e.g., player decisions) associated with previous gameplay sessions at gaming devices 108 (e.g., based on game type, based on a player profile, etc.). In some examples, the training data 143 may include gameplay data and player behavior (e.g., player decisions) associated with a current gameplay session at a gaming device 108. For example, the training data 143 may include previous data (e.g., gameplay data, player behavior, gameplay decisions, etc.) from the same player as well as previous data (e.g., gameplay data, player behavior, gameplay decisions, etc.) from other players (e.g., similar players, players having similar playstyle characteristics, etc.) in the venue. In some aspects, the training data 143 may include anonymous player information and/or data (e.g., not tracked by player identification information).

In an example, the training data 143 may include a dataset (e.g., gameplay data, player behavior, sensor data, calculated or predicted emotional states, etc.), and the neural network may implement a K-means algorithm which includes iteratively partitioning the dataset into K pre-defined, distinct, non-overlapping subgroups (also referred to herein as clusters or playstyles) where each data point belongs to only one subgroup. In some cases, implementation of the K-means algorithm may include partitioning the dataset such that intra-cluster data points are as similar as possible (e.g., within a threshold criteria) while clusters are as different (e.g., far, in accordance with a threshold distance) as possible.

In an example, the clusters may be identifiable from the analyzed dataset (e.g., gameplay data) based on a set of features pre-defined at the gaming system 100. In some aspects, the gaming system 100 may support defining and/or modifying (e.g., redefining, reconfiguring) the set of features at the gaming server 116 or a communication device 144 (e.g., by a casino establishment, a casino manager, etc.).

Example features include: a credit amount at the start of a gameplay session (e.g., 'SumCashInAmount'), a credit amount at the end of a gameplay session (e.g., 'SumCashOutAmount'), quantity of wager adjustments during a temporal period and/or during a gameplay session (e.g., 'No. of bet changes'), a ratio of a wager amount to a player bankroll (e.g., 'Wager-Bank-Ratio'), gameplay duration associated with gameplay session (e.g., 'TimePlayed'), average wager amount for a primary game (base game) (e.g., 'AverageWagerPrimary'), an average win amount associated with a primary game (e.g., 'AveragePrimaryWinAmount'), quantity of primary games played during a temporal period and/or during a gameplay session (e.g., 'No.PrimaryGamesPlayed'), quantity of secondary games (bonus games) played during a temporal period and/or during a gameplay session (e.g., 'No.SecondaryGamesPlayed), or the like.

Other example features include: emotional state at the start of a gameplay session, emotional state at the end of a gameplay session, quantity of changes in emotional state during a temporal period and/or during a gameplay session, frequency of changes in emotional state during a temporal period and/or during a gameplay session, gameplay duration associated with gameplay session and an emotional state, average wager amount based on emotional state, average win amount associated with an emotional state, quantity of primary games played with respect to an emotional state, quantity of secondary games (bonus games) played with respect to an emotional state, or the like. In some aspects, the example features may include sensor data (e.g., biometric data, pressure sensor data, etc.) associated with each of the emotional states, wager amounts, gameplay sessions, primary games played, secondary games played, etc.

According to example aspects of the present disclosure, the playstyles described herein may be derived from gameplay data and/or sensor data associated with all players that play a given game. In some aspects, the gaming server 116 (e.g., machine learning engine 141) may generate playstyles by clustering the gameplay data and/or sensor data of all players using specified attributes derived from the data. When a player plays a game (e.g., makes gameplay decisions during a gameplay session), the gaming server 116 (e.g., machine learning engine 141) may compare gameplay data and/or sensor data associated with the player to clusters of gameplay data and/or sensor data monitored by the AI system to determine which cluster the behavior of the player belongs to.

In some aspects, the neural network may generate an output including data summaries associated with each cluster. Each data summary may include an indication of any combination of features defined at the gaming system 100.

An example data summary for a cluster is below:
Summary of this Cluster:
Percentage of sessions assigned to this cluster: 19.8%
Number of wagers is less than average.
Sessions are shorter than average.
The average primary wagers were average.
Wagers are the most correlated with cash (positive).
Players played one game.
Did not change bet (NoDistinctWagerPrimary).

Another example data summary for a cluster associated with emotional states is below. In an example, the emotional states may be derived from a camera system, facial recognition system, and expression detection system (e.g., using one or more sensors 145 described herein). In an example, the emotional state may be derived by a subsystem included in the system 100. The subsystem may be capable of reading emotional states and tracking changes in emotional state over time. The emotional states (and changes thereof) may be used as input for additional clustering attributes.

Summary of this Cluster:
Happiness meter.
Satisfaction meter.
Heart rate.
Body temperature changes.
Anger level.
Voice/sound levels.
Pressure sensor data (intensity of a button press as detected by a pressure sensor).

The system 100 (e.g., subsystem thereof) may correlate data from the sensors 145 (e.g., biometric sensors, etc.) to gameplay data indicative of what is happening in during a gameplay session. The algorithms described herein may support the interpretation of the data (e.g., less the user). In an example, from the data, the system 100 (e.g., using an algorithm described herein) may identify that "if there are significant heart rate increases, gameplay sessions tend to be significantly longer." In another example, the system 100 may identify a gameplay session(s) in which a player is continuing to play only based on frustration, and the system 100 may trigger measures associated with responsible gaming.

In some aspects, the gaming system 100 may support assigning playstyle names to each cluster. In some examples, the gaming system 100 may support manual entry and assignment of playstyle names to each cluster. Some example playstyle names include: 'Time Killer', 'Entertainment Player', 'Gambler', 'Money Chaser', 'Bonus Chaser', and 'High Roller'. Some example playstyle names associated with an emotional state may include: 'Happy', 'Sad', 'Frustrated', 'Excited', 'Interested', 'Not interested', 'Agitated', and 'Tired', but are not limited thereto.

According to example aspects of the present disclosure, the gaming server 116 (e.g., machine learning engine 141) may use modeling algorithms (e.g., random forest models, neural network, other modeling algorithms, etc.) for training of decision points of the data models 142 described herein. For example, the gaming server 116 may use random forest models for training of decision points of the data model 142-*a* (e.g., playstyle model) and/or the data model 142-*b* (e.g., emotion prediction model). In some aspects, the gaming server 116 may train the decision points based on gameplay data (e.g., player handle pulls, player decisions, etc.) and/or sensor data (e.g., biometric data, pressure sensor data, etc.). In some aspects, the gaming system 100 may support incorporating additional models as additional data (e.g., additional or new research) for increasing the efficiency and accuracy associated with predictions by the data models 142.

The gaming server 116 may store the gameplay data and/or sensor data for a player according to a user identifier (e.g., corresponding to a player account with a casino, a gaming platform, etc.). In some aspects, the gaming server 116 may store the gameplay data and/or sensor data such that the identity of the player associated therewith is anonymous. The gaming server 116 may apply all historical data or a portion of the historical data to generate and/or train a data model 142.

In some aspects, to generate and/or train a data model 142 for a gaming device 108 (e.g., gaming device 108-*a*) of a first game type, the gaming server 116 (e.g., machine learning engine 141) may apply a first set of data acquired from gaming devices 108 of the first game type. In an example, the first game type may be random number generated (RNG)-based game type.

Additionally, or alternatively, the gaming server 116 (e.g., machine learning engine 141) may apply a second set of data acquired from gaming devices 108 of a second game type (e.g., another RNG-based game type) that is similar to the first game type. In an example, the second game type may have one or more features in common with the first game type. In some aspects, the data model 142 generated and/or trained for the gaming device 108 (e.g., gaming device 108-*a*) of the first game type may be used by both the gaming device 108 of the first game type and the gaming devices 108 of the second game type.

Additionally, or alternatively, the gaming server 116 (e.g., machine learning engine 141) may apply a third set of data acquired from gaming devices 108 of a third game type (e.g., an electronic table game, a skill-based game, a semi skill-based game, etc.) that is different from the first game type. In some aspects, the data model 142 generated and/or trained for the gaming device 108 (e.g., gaming device 108-*a*) of the first game type may be used by both the gaming device 108 of the first game type and the gaming devices 108 of the third game type.

The gaming system 100 may support the use of meta data tags. In an example, a gaming device 108 (or gaming server 116) may use a series of meta data tags to determine which data model(s) 142 are compatible for use with the gaming device 108. For example, the gaming device 108 (or gaming server 116) may determine which data model(s) 142 are compatible for use with a game type implemented at the gaming device 108.

In some aspects, training of the data model(s) 142 described herein may be implemented offline (e.g., once a gameplay session has been completed) and/or in real-time (e.g., based on a trigger condition such as a temporal duration, a quantity of completed gameplay decisions, a quantity of gameplay events, etc.). In an example, gameplay data and/or sensor data associated with a completed gameplay session (or collected based on a trigger condition) may be processed locally (e.g., at a gaming device 108) or may be sent and processed at the gaming server 116.

In some examples, the gameplay data and/or sensor data may be added to a total amount of data associated with a player. In an example aspect, the machine learning engine 141 (e.g., implemented at the gaming device 108 or the gaming server 116) may further train (e.g., retrain, modify, etc.) the data model(s) 142, using the added gameplay data and/or added sensor data.

In an example, the gaming server 116 may train (e.g., retain, modify, etc.) the data model(s) 142 using gameplay data and/or sensor data that is was more recently captured or measured compared to other gameplay data and/or sensor data. For example, by training the data model(s) 142 using gameplay data and/or sensor data that is relatively recent, the gaming server 116 may account for changes in gameplay patterns of a player that may occur over time.

In an example, the gaming server 116 may provide the data model(s) 142 with a "memory" over the last X events, where X is a variable parameter. Accordingly, for example, subsequent decisions and progress of evolvement of the data model(s) 142 may be based on previous events within one or throughout multiple gameplay sessions and visits.

In some aspects, the type of data (e.g., associated game type, associated gameplay market, etc.) used herein for training a data model(s) 142 may be of the same type (e.g., same game type, same gameplay market, etc.) as the input data for generating (e.g., creating) the data model(s) 142.

Additionally, or alternatively, the type of data used for training a data model(s) 142 may be of a different type (e.g., different game type, different gameplay market, etc.) as the input data for generating the data model(s) 142, for example, so as to enable "game portability testing." Accordingly, for example, aspects of the present disclosure support training a data model 142 based on a game of a first game type, but executing the data model 142 for different game types and/or different markets for game evaluation. In some aspects, once a data model 142 is built, the gaming system 100 may support training the data model 142 on any data set (e.g., any data set compatible with the data model 142). Thus, a data model 142 described herein can exhibit different behaviors based upon the data that the data model 142 was trained on.

In some examples, a data model 142 trained for one game can be tested to play a different game. In an example, the data model 142 may be used to verify how a model from one game type, gameplay market, player segment, etc. would perform with respect to another game type, gameplay market, player segment, etc.

Accordingly, for example, aspects of the present disclosure support using the data model 142 to verify a degree in which a gambling game could be translated to an entertainment player. That is, aspects of the present disclosure support techniques for verifying the degree in which the data model 142 could perform across different games (e.g., game types), different markets, and/or different play styles.

In some aspects of the present disclosure, a data model(s) 142 described herein may reuse previously generated model output data as new input data. That is, for example, a data model(s) 142 described herein may support self-evolvement based on its own output (e.g., its own AI generated data). Accordingly, for example, the system 100 may be implemented with a goal of predicting as many sequences as possible using a relatively small (e.g., a few) generic playing transactions as input for a data model(s) 142. An example approach for predicting the sequences is to use a moving a window as input for the data model(s) 142 to produce an output, for example, assuming that the sequences in the beginning of the gameplay session(s) are generic and belong to a player. As the data model(s) 142 predicts subsequent transactions, the input window may refrain from using authentic transactions (e.g., actual gameplay data), but synthetic ones already produced by the data model(s) 142. In some aspects, the system 100 may monitor a similarity between the synthetic outputs and the expected output, because at some point in time, the synthetic outputs may no longer match the expected output once the data model(s) 142 no longer has access to any authentic transactions. Another example approach may include producing a sequence instead of a single output, such that the data model(s) 142 may fall off (e.g., no longer match an expected output(s)) relatively later compared to the other example approach above. For example, aspects of the present disclosure may support discarding the authentic transactions such that authentic transactions that preserve information of the playstyle of the player are maintained (e.g., conservatively maintained) in the input window.

In some aspects, the data model(s) 142 may reuse an amount of the generated model output data such that the reused data is below a threshold data amount. In some aspects, the gaming server 116 (e.g., machine learning engine 141) may set the threshold amount such that any noise associated with reusing the generated model output data is below a noise threshold. That is, for example, the gaming server 116 (e.g., machine learning engine 141) may set the threshold data amount such that the generated model output data retains a similarity (e.g., within a threshold difference value) with training data.

In some aspects, the threshold data amount may be set based on the evaluation metric used for noisiness of the generated model output data. In an example, aspects of the present disclosure may support producing sequences (e.g., predictions) using the reused data until the produced output (e.g., additional generated model output data) becomes too irrelevant. For example, if the generated model output data no longer represents the playing pattern of a target player(s), the gaming server 116 may assume that the produced data is too noisy, and the gaming server 116 may refrain from reusing previous generated model output data.

In an example of noise measurement, the gaming server 116 may specify a distance metric that computes how different a predicted output(s) (e.g., as included in generated model output data) is with respect to an actual output(s) (e.g., as included in training data). Additionally, or alternatively, a data model(s) 142 implemented in the system 100 may constantly monitor produced sequences (e.g., predictions) and verify whether the produced sequences represent a target playstyle. In an example, if the data model(s) 142 (also referred to herein as a monitor module) specifies that a sequence(s) no longer represents the target playstyle (e.g., with respect to an accuracy threshold), the gaming server 116 may assume that the produced data is too noisy, and the gaming server 116 may modify the threshold data amount associated with the reused data and/or refrain from producing additional sequences.

The memory 124 may be configured to store program instructions (instruction sets) that are executable by the processor 120 and provide functionality of a machine learning engine 141. The memory 124 may also be configured to store data or information that is useable or capable of being called by the instructions stored in memory 124. One example of data that may be stored in memory 124 for use by components thereof is a data model(s) 142 and/or training data 143. The data model(s) 142 may be a neural network model. The training data 143 may include training data and feedback.

The machine learning engine 141 may include a single or multiple engines. The gaming server 116 (e.g., the machine learning engine 141) may utilize one or more data models 142 for recognizing and processing information obtained from gaming devices 108, communication devices 144, other servers, and/or databases (e.g., player profile database 148, gaming device database 154, ticket/voucher database 152). In some aspects, the gaming server 116 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142. For example, the data model(s) 142 may be built and updated by the machine learning engine 141 based on the training data 143. The data model(s) 142 may be provided in any number of formats or forms. Non-limiting examples of the data model(s) 142 include autoregressive models, Decision Trees, Random Forest, Support Vector Machines (SVMs), Nearest Neighbor, and/or Bayesian classifiers. The machine learning engine 141 and/or the data models 142 may be implemented at any of a gaming device(s) 108, a gaming server(s) 116, and/or a communication device(s) 144 described herein.

In some aspects, the data model(s) 142 may support features for self-evolving (also referred to herein as self-learning). For example, the data model(s) 142 may be self-learning AI models capable of self-training using unlabeled data sets. In an example, the unlabeled data sets may include data (e.g., gameplay data, sensor data, emotional states, etc.) that has not been tagged with labels identifying characteristics, properties, or classifications. In some aspects, the data model(s) 142 may analyze unlabeled datasets and identify, from the data included in the datasets, patterns that the data model(s) 142 can draw conclusions from. For example, the patterns may indicate a correlation between gameplay decisions and emotional states associated with a player. Accordingly, for example, aspects of the present disclosure may support data models capable of being self-trained for cases in which a large amount of training data is not available. Example aspects of self-evolving may incorporate example K-means clustering/algorithms described herein.

In some aspects, self-evolving of an AI model(s) as described herein may include changing the game math to suit changing gameplay behaviors of a player associated with the AI model(s). Accordingly, for example, aspects of the present disclosure support self-evolving of an AI model(s) to accommodate variations in gameplay behavior of a player and to provide recommended actions to the player.

A first example of changing the game math may include modifying an event frequency associated with a gameplay session(s). For example, changing the game math may include modifying a hit frequency of bonuses, a near miss events frequency, a general frequency associated with triggering events (e.g., gameplay events), or the like.

In some aspects of the first example, the gaming server 116 may display (e.g., via a gaming device 108 and/or a communication device 144 associated with a gameplay session) an indication associated with the modification to the game math (e.g., in order to remain in compliance with gaming regulations or other regulations). In an example, the gaming server 116 may apply a mode type (e.g., "normal mode," "frenzy mode," etc.) associated with the modification. In some aspects, the gaming server 116 may display a notification indicating the mode type (e.g., "normal mode," "frenzy mode," etc.) associated with the modification, such that the player is aware that the gameplay session has been modified. Accordingly, for example, the indication may provide players with an opportunity to understand what is occurring during a gameplay session and/or a corresponding reason.

In some aspects of the first example, during a gameplay session at a gaming device 108, the gaming server 116 may apply a mode type (e.g., "frenzy mode") for a temporal duration, and the gaming server 116 may display (e.g., via the gaming device 108) a timer associated with the duration of the mode type. In an example, the gaming server 116 may apply the "frenzy mode" for a temporal duration (e.g., one minute), during which the gaming server 116 may display (e.g., via the gaming device 108) a user interface in which one or more graphical elements are different compared to the "normal mode." In some aspects, the user interface associated with the "frenzy mode" may be different (e.g., partially different, entirely different, etc.) from the user interface associated with the "normal mode," but the math/ReturnTo-Player may be similar/the same for both modes. Accordingly, for example, aspects of the present disclosure may support a "fake new math."

In some other aspects of the first example, changing the game math may include switching between paytables from among a set of paytables having the same payout percentage. In an example, the gaming server 116 may apply one or more of the paytables to a gameplay session based on a player. For example, the gaming server 116 may differently promote gameplay modes associated with the paytables (e.g., using different naming conventions, user interfaces, etc.) so as to increase attraction to a player/increase perceived fit by the player. In some aspects, the gaming server 116 may implement an AI model described herein for deciding (e.g., based on criteria) when to switch between paytables.

A second example of changing the game math may include modifying one or more game rules associated with a gameplay session, such as by adding a bonus or a multiplier based on a player's interests. In some aspects, the gaming server 116 may modify one or more game rules such that the modification is relatively obvious to the player (e.g., based on gameplay outcomes), so as to keep the player attracted to the game. In some aspects, the gaming server 116 may provide the player the option of "player interaction" (e.g., through player selection of a symbol, for example, an added golden symbol). In an example, when the gaming server 116 determines (e.g., predicts) that the player may leave a gaming device 108 or terminate a gameplay session relatively soon (e.g., within a temporal threshold or temporal quantity of plays), the gaming server 116 may trigger providing the player with the "player interaction option" so as to encourage the player to stay longer at the gaming device 108.

A third example of changing the game math may include one or more aspects of the first example and one or more aspects of the second example described above.

A fourth example of changing the game math may include modifying the reward systems associated with a gaming device 108 and/or a gameplay session. For example, some gaming devices 108 such as video lottery terminals (VLTs) follow the same rule (e.g., a random function that produces probabilities). These probabilities may determine how well a player will be rewarded. In some gaming systems, different games can be differentiated by how rewarding the games are and how frequent the games reward a player. For example, a game "A" at a gaming device 108-*a* may rewards player 20% of the time, with a chance of multiplying the player's bet by a factor of 2. In another example, a game "B" may reward the players 10% of the time, but with a chance of multiplying the player's bet by a factor of 4. If a player places enough bets on both games with a constant amount, the player would be rewarded similarly (e.g., an equal cumulative payout). But as a user, game "B" may be perceived to be riskier than game "A," or playing game "A" may be perceived as boring because the reward is relatively low. Accordingly, for example, aspects of the present disclosure may support using the described models in association with modifying reward systems, monitoring player emotional states, and monitoring gameplay data so as to provide insight on how players react to different enhancements to game math (e.g., math modules) of games.

The training data 143 may include any data managed by the gaming server 116 with respect to the ticket/voucher management instruction set 132, the player profile management instruction set 136, and/or the game management instruction set 140 described herein. For example, the training data 143 may include player histories (e.g., gameplay data, player behavior, sensor data, emotional states, etc.) associated with gameplay sessions at a gaming device(s) 108. In some aspects, the training data 143 may be stored (e.g., in the memory 124, a database, etc.) according to player profile and/or game type.

In some examples, the training data 143 may include player histories (e.g., gameplay data, player behavior, sensor data, emotional states, etc.) associated with previously invoked auto play modes. In some other examples, the training data 143 may include player histories associated with previous instances of pausing or terminating a gameplay session. In some other examples, the training data 143 may include player histories associated with previous gameplay decisions (e.g., a decision to gamble, a wager amount, quantity of lines played, a decision to make a bet dependent on another bet outcome (e.g., place a side bet), etc.). In some aspects, the machine learning engine 141 may be configured to analyze aggregated player histories, gameplay data, and/or auto play mode parameters, that are historical or in real-time.

According to example aspects of the present disclosure, the data model(s) 142 may include pre-created, self-learning AI-based playstyle models. In an example, the playstyle models may represent playstyle behaviors. For example, the playstyle models may include playstyle behavior or gameplay patterns associated with gameplay decisions (e.g., game configurations, wager amounts, etc.), gameplay style (e.g., risk taking, risk averse/conservative, etc.), or the like. In some aspects, a "playstyle model" described herein may correspond to gameplay patterns and/or gameplay style of a player, and may also be referred to herein as a "player model."

In some aspects, the data model(s) 142 may include baseline models that are built with gameplay data of previous gameplay sessions to reflect default playstyle behaviors to start with. In some aspects, the previous gameplay sessions may have been conducted by the same player in the past, by similar players, in similar markets (e.g., compared to a market in which the data model(s) 142 is implemented), at a venue in which the data model(s) 142 is implemented, at venues similar to the venue, etc.

In some aspects, a baseline model may be a "default playstyle behavior model" created based on historical gameplay data (e.g., anonymous and/or associated with a player identifier) that is associated with a specific market(s), a specific venue(s), a specific game type(s), a specific game(s), a specific playstyle cluster(s), etc. The "default playstyle behavior model" may be unique in the sense of gaming data of a specific RNG-based casino game, for example, in which gameplay outcomes are truly random and not controllable by a player.

Aspects of the present disclosure may support evolvement of the data model(s) 142 in association with gameplay data of a player(s) (e.g., identified by a personal identifier or an anonymous player identifier). In some aspects, a baseline model may evolve differently in accordance with different respective players, gameplay data associated with the players, sensor data (e.g., biometric data, pressure sensor data, etc.) associated with the players, gameplay behavior associated with the players, etc.

Some examples of the gameplay data include: total cash in amount, average primary wager, standard deviation of primary wager, number of distinct primary wagers, no of primary wagers, total primary wagers, session length, number of games played, number of times the bonus was experienced, the possibility of cashing out after hitting a bonus in the game, the possibility of changing the game after hitting a bonus in the game, available cash (bank) wager correlation, average time between spins, standard deviation of time between spins, total cash out, total primary win, average primary win, average secondary wager, average secondary win, sum of secondary win, starting cash in, additional cash in, coin-in to coin-out ratio, net loss, % loss, play intensity (e.g., wagers per minute in a gameplay session), time of the day segment day/evening, cash out occurrence flag, cash out to cash in ratio, post loss, post win, primary wager changes, number of cash ins, average cash in, wager to cash in, tradeoff, secondary to primary, wager to bank ratio, primary wager changes/no games, maximum cash in, cash in separated by ticket/note/coin, number of cash outs, max cash out, number of primary wins, list of played games incl. number of plays, list of played denominations including number of plays, etc., and the gameplay data is not limited thereto.

In some aspects, the gaming system 100 may support data collection in which data (e.g., gameplay data, sensor data, etc.) is collected directly via a gaming device 108 associated with a player and a gameplay session. In some aspects, the data may be collected via a central game management system, a player tracking system, a casino management system, a controller/data aggregator (e.g., iLink-type device), or the like. For example, the gaming device 108 may track every input made by the player is tracked and bypassed to feed an existing playstyle model (e.g., an existing baseline model). The tracked inputs may include active inputs (e.g., a gameplay decision, a button press, a handle pull, etc.) and/or passive inputs (e.g., a measured biometric parameter) In some examples, the gaming device 108 may track and forward gameplay results (e.g., resulting game outcomes) to the playstyle model. Accordingly, for example, the playstyle model receives data provided by a player (e.g., gameplay data such as player inputs, sensor data such as biometric data, etc.) and gameplay results (e.g., outputs from the gaming device 108).

The data provided by the player and the gameplay results provided by the gaming device 108 is useful for AI/machine learning, as such data is very raw data that is a 1:1 reflection (correlation) of every single player action to a corresponding achieved game output (gameplay result). Aspects of the present disclosure include collecting all data (e.g., data provided by the player, gameplay results provided by the gaming device 108, etc.), filtering a portion of the data and processing the same by the AI, and storing and incorporating the AI-processed data into a playstyle model (e.g., so as to evolve the playstyle model).

In some aspects, evolvement and/or training (retraining) of a data model(s) 142 (e.g., playstyle model) may be implemented using other input types. For example, aspects of the present disclosure may include collecting and considering data from online casino games (e.g., gameplay sessions at a communication device 144 such as a mobile device or personal computer). In an example, the gaming server 116 (e.g., machine learning engine 141) may differentiate between data collected when the player starts playing a game (e.g., a slot game) at a gaming device 108 at a casino venue and data collected when the player continues playing the same game online (e.g., using a communication device 144).

Accordingly, for example, the gaming server 116 (e.g., machine learning engine 141) may generate data model(s) 142 (e.g., playstyle models) capable of identifying differences in player behavior and/or emotional states with respect to instances of casino gaming and mobile gaming. In some aspects, the gaming server 116 (e.g., using the machine learning engine 141 and the data model(s) 142) may provide recommended actions that correspond to historical gameplay data, gameplay behavior, and/or sensor data associated with a player, in which the recommended actions may be provided based on the type of device (e.g., a gaming device 108 at a casino venue, a communication device 144 used for mobile gaming, etc.) associated with a gameplay session.

In some implementations, aspects of generating, training, and/or self-evolving of the data model(s) 142 (e.g., playstyle models) described herein may incorporate game play data from skill-based or semi skill-based games, such as analyzing decisions made, level of player's skill, etc. Accordingly, for example, the gaming server 116 (e.g., machine learning engine 141) may generate and train data model(s) 142 (and the data model(s) 142 may self-evolve) based on gameplay data provided from any combination of chance-based game types (e.g., RNG, etc.) and skill-based game types.

In some examples, a playstyle model may correspond to a playstyle behavior corresponding to a player profile. For example, the gaming system 100 may support playstyle models which implement gameplay decisions and/or gameplay patterns that correspond to respective playstyles of different player profiles (e.g., different players). For example, a playstyle model corresponding to a player profile may be trained (e.g., at the gaming server 116, the machine learning engine 141, etc.) based on previous and/or current gameplay decisions by a player associated with the player profile.

The playstyle models may be built to represent "common playstyle behaviors" derived from K-means clustering of previous (e.g., pre-collected) gameplay data and gameplay behaviors. The playstyle models may support fully-autonomous and/or semi-autonomous gameplay at a gaming device 108 according to certain player-like play behaviors.

In an example, the playstyle models may be provided (e.g., by the gaming server 116, a communication device 144, a gaming device 108) with a "memory" over past gaming events (e.g., the last X events, where X may be a variable parameter value). In an example, for a gameplay session at a gaming device 108, subsequent decisions by the playstyle model may be based on previous events (e.g., previous gameplay decisions by the playstyle model, previous gameplay decisions by a player, a gameplay result associated with a previous gameplay decision, etc.) in the gameplay session.

For example, each playstyle model may have its own prediction algorithm such as decision tree or neural network. In an example, reflecting previous events, each playstyle model may execute decisions according to its own decision tree or random forest to perform an action (e.g., a gameplay decision). Alternative or additional to the playstyle models, gameplay decisions associated with an auto play mode at a gaming device 108 may be implemented by a neural network based on frame buffer feedback. Accordingly, for example, each playstyle model may include "memory capabilities" to reflect and analyze previous gameplay events and make a gameplay decision (e.g., a wager amount, a quantity of lines to play, a side bet, etc.), for upcoming gameplay events based upon the same.

In some aspects, the techniques described herein my incorporate AI mechanisms (e.g., machine learning engine 141, data model(s) 142, etc.) which provide functionality to detect a player's playstyle. Based on the detected playstyle, such AI mechanisms may adjust gameplay settings at a gaming device 108 to better meet a player's preferred and expected play style behavior. Some example settings may include wager amounts, payline settings (e.g., in a case of a reel machine), etc. In some aspects, the AI mechanisms may be fed with gameplay data (e.g., training data 143), behavioral data, and/or sensor data (e.g., biometric data, etc.) of additional gameplay sessions over time (e.g., over additional gameplay sessions) to derive behavioral results to create the biggest player satisfaction (e.g., with respect to player needs, for example, a relative improvement in emotional state).

In some aspects, the AI mechanisms (e.g., machine learning engine 141, data model(s) 142, etc.) detecting a player's playstyle may include self-learning capabilities based on both real-time events (e.g., game events, gameplay decisions, gameplay results, decision events, etc.) associated with a game and smart sensory data (e.g., biometric data, etc.) derived from scanning the player using a sensor(s) 145. That is, for example, the AI mechanisms may incorporate algorithms capable of predicting player satisfaction in real-time based on real-time events, satisfaction history of the player, and/or satisfaction history of similar players (e.g., analyzed from historically collected gameplay data and/or sensor data).

In some examples, the AI may generate playstyle models based on previous gameplay sessions associated with the same player, previous gameplay sessions associated with players of a similar type (e.g., players associated with an entertainment playstyle, a 'high roller' playstyle, a 'jackpot hunter' playstyle, etc.), previous gameplay sessions associated with similar markets (e.g., markets having overlapping characteristics), previous gameplay sessions associated with similar venues (e.g., venues having overlapping characteristics), etc.

In some aspects, the gaming system 100 may support executable playstyle models that may be invoked on behalf of a player. In an example, the gaming server 116 may provide selectable playstyle models to a player via a user interface of the gaming device 108 and/or via a user interface of a communication device 144. In some cases, the gaming server 116 may derive the playstyle models from data analytics (e.g., included in training data 143), and the derived playstyle models may reflect different player profiles and/or different playstyle behaviors (e.g., for different games, different game types, different casino visit objectives, and/or other underlying parameters).

The playstyle models may be developed, generated, and/or trained (e.g., by the gaming server 116, a communication device 144, etc.) using a data-driven approach or other machine learning techniques including deep learning and re-enforcement learning.

In some cases, the playstyle models may be generated to mimic human behavior corresponding to a player and/or human behavior corresponding to a playstyle. In an example, a playstyle model would receive game results, player-behavioral habits, and sensor data (e.g., biometric data, pressure sensor data, etc.), reflect on and analyze such information, and act on the results (e.g., generate and provide a recommended action described herein, self-evolve based on the results as described herein, etc.).

In some cases, the playstyle models may be generated based on data (e.g., gameplay data, player data, sensor data, etc.) acquired from different markets. The markets, for example, may include casino markets associated with different geographical areas. The gaming server 116 may input data (e.g., gameplay data, player data, etc.) into a data model(s) 142 for analysis.

The machine learning engine 141 may build any number of configuration profiles (e.g., player profiles, gaming device 108 profiles, playstyle profiles) using automatic processing, using artificial intelligence and/or using input from one or more users associated with the communication device 144. The machine learning engine 141 may use automatic processing, artificial intelligence, and/or inputs from one or more users of the communication devices 144 to determine, manage, and/or combine information relevant to a configuration profile. Example aspects of such configuration profiles are described in further detail below.

The machine learning engine 141 may determine configuration profile information based on a user's interactions with information. The machine learning engine 141 may update (e.g., continuously, periodically, etc.) configuration profiles based on new information that is relevant. The machine learning engine 141 may receive new information from any communication device 144, the gaming server 116, any database described herein, etc. Profile information may be organized and classified in various manners. In some aspects, the organization and classification of configuration profile information may be determined by automatic processing, by artificial intelligence and/or by one or more users of a communication device 144 (e.g., a player, casino personnel, a casino manager, etc.).

In an example, the gaming server 116, a gaming device 108 and/or a communication device 144 may provide, to the machine learning engine 141, gameplay data (e.g., a gameplay decision, a gameplay result, etc.), an emotional state(s) of a player, and/or user information associated with a gameplay session (e.g., previous or current) at the gaming device 108. In an example, the gameplay data may include a quantity of plays (e.g., number of spins), duration of gameplay, credits spent, credits earned, etc. In some examples, the user information may include player identification information (e.g., stored on a player identification card, associated with a player access code, stored on a communication device 144 of a player, etc.). In some other examples, the user information may include a playstyle model stored on a communication device 144 or other device (e.g., a portable memory device) of a player.

In an example, the emotional state of the user may be generated by the machine learning engine 141 based on sensor data (e.g., biometric data, pressure sensor data, etc.), using a data model 142 (e.g., data model 142-b).

The machine learning engine 141 may process the gameplay data, emotional state(s), and/or user information using the data model(s) 142. For example, the machine learning engine 141 may process previous gameplay data (e.g., previous gameplay decisions), based on which the machine learning engine 141 may generate and/or modify a playstyle model(s).

In another example, the gaming server 116 may provide gameplay data and sensor data (and/or an emotional state corresponding to the sensor data) associated with a current gameplay session at a gaming device 108, to the machine learning engine 141. In an example, the gameplay data may include gameplay decisions associated with the current gameplay session. The sensor data may include, for example, biometric data as described herein. The machine learning engine 141 may process the gameplay decisions associated with the current gameplay session and generate an output based on processing the gameplay decisions.

For example, the machine learning engine 141 may identify a gameplay pattern associated with the gameplay decisions, and the machine learning engine 141 may identify a playstyle model that corresponds to the gameplay pattern. In an example, the machine learning engine 141 may compare the gameplay pattern to gameplay patterns associated with a set of playstyle models (e.g., data model(s) 142).

Further, for example, the machine learning engine 141 may process the gameplay decisions and the sensor data using the identified playstyle model. The gaming server 116 (e.g., using the machine learning engine 141 and the playstyle model) may compare the gameplay decisions to previous gameplay decisions (also referred to herein as historical actions and/or historical decisions) by the player, for example, as represented by the playstyle model.

In an example, the gaming server 116 may determine that there is a match between the gameplay decision and a previous gameplay decision (e.g., with respect to similar gameplay conditions). The gaming server may add the gameplay decision to a history (e.g., implemented at a database or memory) of previous gameplay decisions (also referred to herein as historical recordings) so as to establish and/or verify accuracy of an applied data model(s) 142 (e.g., an applied playstyle model) with respect to the gameplay decision.

Additionally, or alternatively, the gaming server 116 may determine that there is not a match between the gameplay decision and a previous gameplay decision (e.g., the action is the different from a previous decision(s) under similar gameplay conditions, the action exceeds a similarity threshold with respect to the previous decision(s), the action is different from and/or exceeds the similarity threshold with respect to a decision predicted by the gaming server 116, etc.). The gaming server 116 (e.g., using the machine learning engine 141) may apply learning techniques associated with identifying the reason of the mismatch. For example, the gaming server 116 may identify whether the mismatch is a result of a spontaneous or non-rational decision by the player, a general behavioral shift of the player (e.g., as determined based on biometric data and/or using the data model 142-b (emotion prediction model), etc.). In some aspects, the gaming server 116 may identify behavioral changes (e.g., potential new behaviors, behavioral shifts, etc.) associated with the player, and the gaming server 116 may modify the playstyle model based on behavioral changes. That is, for example, the gaming server 116 may modify the playstyle model to account for different emotional states of the player when providing recommended actions (e.g., gameplay decisions). Accordingly, for example, the playstyle model may support features for self-evolving (also referred to herein as self-learning).

In an example, for a gameplay session associated with a player and the gaming device 108, the machine learning network may generate an output inclusive of probability information and confidence information corresponding to modifying the playstyle model. The probability information may include a probability score (e.g., from 0.00 to 1.00) associated with a predicted parameter value(s). The confidence information may include a confidence score (e.g., from 0.00 to 1.00) corresponding to the probability score(s).

For example, the gaming server 116 (e.g., machine learning engine 141) may determine a probability score for modifying the playstyle model based on a correlation between gameplay behavior of the player and gameplay behavior associated with a playstyle model. In some examples, the machine learning engine 141 may output a relatively low probability score for modifying the playstyle model for cases in which the machine learning engine 141 identifies relatively high correlation (e.g., above a threshold) between the gameplay behaviors. In some other examples, the machine learning engine 141 may output a relatively high probability score for modifying the playstyle model for cases in which the machine learning engine 141 identifies a relatively low correlation (e.g., below a threshold) between the gameplay behaviors.

In another example, the gaming server 116 (e.g., machine learning engine 141) may determine a probability score for modifying the playstyle model based on an emotional state of the player with respect to a previous gameplay event (e.g., a previous gameplay decision event, a previous gameplay decision, a previous gameplay result, etc.) and the emotional state of the player with respect to a subsequent gameplay event (e.g., a subsequent gameplay decision event, a subsequent gameplay decision, a subsequent gameplay result, etc.). In some examples, the machine learning engine 141 may output a relatively low probability score for modifying the playstyle model for cases in which the machine learning engine 141 identifies no change or a relatively small change (e.g., positive or negative change, below a threshold) to the emotional state of the player. In some other examples, the machine learning engine 141 may output a relatively high probability score for modifying the playstyle model for cases in which the machine learning engine 141 identifies a relatively high change (e.g., positive or negative change, greater than or equal to the threshold) to the emotional state of the player.

In some other examples, for a gameplay session associated with a player and the gaming device 108, the machine learning network may generate an output inclusive of probability information and confidence information corresponding to emotional states predicted by the machine learning network (e.g., predictions by an emotion prediction model described herein).

The machine learning engine 141 may support processing any combination of data associated with a gameplay session. For example, the machine learning engine 141 (e.g., using a playstyle model) may provide proposed gameplay decisions associated with decision events of a gameplay session. In an example, the proposed gameplay decisions may include proposed wager amounts, proposed gameplay selections (e.g., payline selection in a reel game, card draws associated with a card game, etc.), proposed selections of bonus prizes, etc.

For example, the machine learning engine 141 may propose the gameplay decisions in accordance with one or more playstyle models. In an example, the machine learning engine 141 may propose gameplay decisions that correspond to a learned playstyle model (e.g., corresponding to the player or another player) and/or a playstyle model associated with a playstyle behavior type (e.g., aggressive, conservative, etc.). Accordingly, for example, the machine learning engine 141 may provide an output inclusive of a proposed gameplay decision. In some examples, the machine learning engine 141 may provide an output inclusive of multiple proposed gameplay decisions corresponding to any combination of playstyle models. In some aspects, the machine learning engine 141 may output probability scores and/or confidence scores corresponding to proposed gameplay decisions.

The machine learning engine 141 may create, select, and execute appropriate processing decisions. Example processing decisions may include setting parameters (e.g., duration, playstyle model) of an auto play mode for a gaming device 108, invoking the auto play mode at the gaming device 108, modifying (e.g., extending, pausing, ending) the auto play mode of the gaming device 108, or the like. Other example processing decisions may include notifying a player of information associated with an auto play mode, such as, whether the auto play mode is available to the player, whether the auto play mode has been invoked, paused, and/or ended, temporal parameters (e.g., end time) associated with the auto play mode, playstyle models available for the auto play mode, playstyle models associated with the auto play mode, risk factors associated with available and/or applied playstyle models, etc. Processing decisions may be handled autonomously and/or semi-autonomously by the machine learning engine 141, with or without human input.

Other example processing decisions include providing an output indicating whether to modify a playstyle model (e.g., modify parameters of the playstyle model, example aspects of which are described herein). Some example processing decisions include modifying the parameters of the playstyle model.

Data within the database of the memory 124 may be updated, revised, edited, or deleted by the machine learning engine 141. In some aspects, the machine learning engine 141 may support continuous, periodic, and/or batch fetching of data (e.g., from gaming devices 108, communication devices 144, databases, servers, etc.) and data aggregation.

Example Aspects and Implementations

With a trained model (e.g., data model 142-a, a trained playstyle model) described herein, data that is generated by a player as well as the state of a gameplay session (e.g., gameplay results, gameplay events, etc.) are fed into a model predictor function. The data may include sensor data (such as biometric data), gameplay decisions, etc. The model predictor function may be implemented by the machine learning engine 141 and the trained model. The model predictor function may generate a prediction which will include a recommended action to take as well as other values and features which correspond to the recommended action. The gaming server 116 (e.g., machine learning engine 141) may transmit an indication of the recommended action to the gaming device 108.

In some aspects, the trained model may be a pre-trained model (baseline model) as described herein. In an example, if the trained model is applied to play the same game repeatedly (e.g., within similar conditions), the behavior (e.g., playstyle behavior) of the trained model may change over time. That is, the trained model may be a self-evolving or evolutionary model.

Example aspects and implementations supported by the present disclosure are described herein with respect to generating playstyle models, incorporating the playstyle models in dynamic auto play modes, modifying the playstyle models (e.g., supportive of self-evolving as described herein), and incorporating the modified playstyle models in dynamic auto play modes.

The gaming system 100 may support configuration of a personal proxy to play a game on behalf of a player during a gameplay session at a gaming device 108. For example, the gaming system 100 may support a generated bot player which, when activated (e.g., in response to a player input), may play on behalf of the player and/or provide gameplay hints to the player. In an example, the bot player may implement gameplay decisions fully-autonomously or semi-autonomously based on player preferences and/or settings of the gaming device 108. In an example, the personal proxy may implement gameplay decisions and/or configure gameplay settings based on a playstyle model and/or modifications to the playstyle model as described herein.

For example, the gaming system 100 may support a smart auto play mode in which the gameplay decisions are implemented autonomously or semi-autonomously at a gaming device 108 based on a playstyle model. Accordingly, for example, the smart auto play mode may be representative of the persona of the player. For example, a gaming device 108 may output a notification proposing (e.g., based on an output by the machine learning engine 141 and/or a data model(s) 142) a best gameplay decision associated with a gameplay session. In an example, the gameplay decision may correspond to a prompt for a selection during a bonus game (e.g., select 1 out of X choices). In some aspects, the best gameplay decision may be based on historical data (e.g., knowledge and/or information about the player and previous gameplay decisions) from, for example, thousands of previous gameplay sessions played by the player and/or similar players.

In some examples, the gaming system 100 may support an auto play mode in which a gameplay session at a gaming device 108 is configured on behalf of a player, based on an applied playstyle model. In some cases, the configuration may be based on game type (e.g., video poker, slot machine, etc.). In some aspects, the configuration may include preferred settings (e.g., gameplay settings, gaming device settings, etc.) of the player. In some aspects, the gaming system 100 may support autonomous and/or semi-autonomous wager modifications (e.g., increases, decreases) at a gaming device 108 based on an applied playstyle model and a result associated with a gameplay decision (e.g., game outcome).

The gaming system 100 may be a central system linked with a casino establishment, a central system linked with a consortium of casino establishments, or the like. The gaming system 100 may support the aggregation, sharing, and exchange of data by devices (e.g., gaming devices 108, gaming servers 116, communication devices 144, databases, etc.) included in the gaming system 100.

For example, the gaming system 100 may be fed portions of gameplay data (e.g., gameplay decisions) associated with gameplay sessions at devices included in the gaming system 100, based on which the gaming server 116 may generate playstyle models described herein. For example, the playstyle models may include prediction profiles indicative of information such as "players who did this, also did that." Via gameplay data gathered and analyzed with respect to gameplay sessions, generated playstyle models may be distributed among devices (e.g., gaming devices 108, gaming servers 116, communication devices 144, etc.). For example, the generated playstyle models and associated prediction profiles and may be selectable/modifiable/implemented by a player for an auto play mode at a gaming device 108. In some aspects, the gaming system 100 may support player inputs associated with manually overwriting (e.g., modifying) any portion of model characteristics of the playstyle models generated by the gaming server 116. For example, the gaming system 100 may support viewing of generated and/or available playstyle models, selection of the playstyle models, and modification of pre-set model characteristics of the playstyle models.

Aspects of the present disclosure described herein provide a "recommendation system" that is an enhancement (e.g., has increased prediction accuracy and provides increased player satisfaction) compared to other recommendation systems. For example, in addition to being based on a "People who like this also liked . . . " strategy, the playstyle models described herein may track player preferences (e.g., "People who like this also liked . . . "). The playstyle models described are capable of virtually playing a game (e.g., implementing gameplay decisions) in accordance with a player's playstyle. That is, for example, additional or alternative to providing gameplay recommendations based on other player's preferences, a playstyle model(s) described herein may provide gameplay recommendations based on a player's personal preferences, gameplay behavior, and/or gameplay experience, proven by the playstyle model(s).

In an example implementation, the gaming system 100 may support auto play configurations (e.g., auto play options). For example, the gaming system 100 may support playstyle models capable of implementing auto play functions corresponding to one or more playstyle models. In some cases, the playstyle models may be preset (e.g., preconfigured) and stored in a database (e.g., player profile database 148) of the gaming system 100. In some other cases, the playstyle models may include playstyle models generated by the gaming server 116 (e.g., machine learning engine 141) during a gameplay session or after completion of the gameplay session.

In some aspects, when a player enables (e.g., via a user input) an auto play mode at a gaming device 108, the player may select a playstyle model (e.g., an entertainment playstyle model, a 'high roller' playstyle model, a 'jackpot hunter' playstyle model, etc.) for implementing the auto play mode. For example, based on a selected playstyle model, a gaming server 116 (or a gaming device 108) may autonomously and/or semi-autonomously implement decisions associated with a gameplay session. In an example, based on the selected playstyle model, the gaming server 116 (or the gaming device 108) may set or modify a wager amount, end a gameplay session (e.g., cash out) based on earned gameplay credits satisfying criteria (e.g., a cash out threshold) associated with the playstyle model and the gameplay session, select bonuses, etc.

In some other aspects, the gaming system 100 may support the switching of playstyle models during a gameplay session. For example, the gaming system 100 may support autonomous switching (e.g., implemented by the gaming server 116 and/or the gaming device 108) between playstyle models based on gameplay criteria such as temporal duration, credits earned, credits lost, winning streaks, losing streaks, changes in gameplay behavior (e.g., as determined based on gameplay decisions), emotional state (e.g., as determined based on sensor data), etc. In some other aspects, the gaming system 100 may support temporary deactivation of auto play modes for portions of a gameplay session (e.g., player override for bonus events, prize selection, etc.).

In some aspects, the gaming system 100 may support temporary switching between playstyle models. In an example, the gaming system 100 may support switching between playstyle models based on a player input associated with a gameplay session. In another example, the gaming system 100 may support autonomous switching (e.g., implemented by the gaming server 116 and/or the gaming device 108) between playstyle models based on available gameplay credits at a gaming device 108 in association with a gameplay session. For example, the gaming server 116 may apply a first playstyle model in association with a first criteria (e.g., available credits exceeding a threshold) but apply a second playstyle model in association with a second criteria (e.g., available credits below a threshold).

Additionally, or alternatively, the gaming system 100 may support autonomous switching (e.g., implemented by the gaming server 116 and/or the gaming device 108) between playstyle models and/or autonomous modification of an applied playstyle model based on an emotional state of a player. The emotional state may be an emotional state calculated based on sensor data described herein. Additionally, or alternatively, the emotional state may be an emotional state predicted (e.g., by the machine learning engine 141, the data model 142-b, etc.) based on previous gameplay data and previous sensor data. According to example aspects of the present disclosure, the gaming server 116 may link an emotional state (e.g., calculated or predicted) to a corresponding playstyle model.

In another example implementation, the gaming system 100 may support adjustments and/or customizations (e.g., manually by the player, autonomously or semi-autonomously by the machine learning engine 141, etc.) to parameters associated with an auto play mode. In some aspects, the gaming system 100 may support adjustments and/or customizations to parameters associated with a playstyle model. An example parameter may include a threshold condition associated with automatically triggering an action (e.g., a cash out event at a gaming device 108, pausing of a gameplay session at the gaming device 108, termination of the gameplay session at the gaming device 108, transfer of the gameplay session to another gaming device 108, applying a different playstyle model to the gameplay session, modifying a current playstyle model applied to a gameplay session, etc.). In an example, the threshold condition may be a condition in which the emotional state of the player matches an emotional state associated with the triggering the action.

For example, the machine learning engine 141 may trigger an action for a cash out event at the gaming device 108 when the player is in an emotional state (e.g., a 'satisfied' emotional state, etc.) associated with cashing out at the gaming device 108. In some examples, the machine learning engine 141 may trigger an action for pausing a gameplay session at the gaming device 108 when the player is in an emotional state (e.g., a 'frustrated' emotional state, a 'tired' emotional state, etc.) associated with pausing the gameplay session. In another example, the machine learning engine 141 may trigger an action for changing a game type at the gaming device 108 when the player is in an emotional state (e.g., a 'bored' emotional state, a 'tired' emotional state, etc.) associated with changing the game type. In some other examples, the machine learning engine 141 may trigger an action for applying a different playstyle model (e.g., an 'aggressive' playstyle model, a 'risky' playstyle model, etc.) when the player is in an emotional state (e.g., a 'bored' emotional state, etc.) associated with changing the playstyle model. In some aspects, the machine learning engine 141 may modify a current playstyle model applied for a gameplay session at the gaming device 108 when the player is in an emotional state (e.g., an 'unhappy' emotional state, a 'displeased' emotional state, etc.) reflecting disapproval of the performance (e.g., gameplay results, entertainment value, etc.) of the playstyle model.

Another example parameter may include a threshold associated with automatically triggering an action (e.g., a cash out event, pausing a gameplay session, changing a game type, applying a different playstyle model, modifying a current playstyle model, etc.) at a gaming device 108 when an amount of credits earned in association with a gameplay decision exceeds the threshold (e.g., a 'big win' according to gameplay settings of a player). Some example criteria associated with triggering an action for a gameplay session include temporal duration, credits earned, credits lost, net credits earned/lost compared to the credits available at the start of the gameplay session, winning streaks, losing streaks, etc. Other example parameters may support enabling/disabling of auto play modes for any portion of a gameplay session (e.g., player override for bonus events, prize selection, etc.).

Some other examples of parameter adjustments or customizations associated with a gameplay decision include: selection of paylines (e.g., lines on which a payout will be awarded), residual credit, adding paylines, reducing paylines, changing wager amounts, loading a payline (e.g., placing an entire bet amount on one payline), smart phone (mobile controller) integration with a gaming device 108, enabling/disabling speed play, enabling/disabling sounds or notifications based on gameplay result (e.g., muted for losses, unmuted for wins above a threshold), enabling sounds or notifications based on available credits (e.g., unmuted if below a threshold), win celebration, etc.

In another example implementation, creating the initial baseline model may include training the baseline model by processing historical gameplay data (e.g., previous gameplay decisions, gameplay results, etc.) of a player for which the baseline model will be created. In some aspects, the historical gameplay data may be tracked via a casino system (e.g., using a unique player identifier associated with a target player). Accordingly, for example, the baseline model may perform (e.g., make gameplay decisions, etc.) such that the baseline model closely behaves like the target player.

Aspects of the initial baseline model may be different from other techniques in which a playstyle model is trained until enough gameplay data (e.g., multiple thousands of gameplay sessions) is available with respect to the target player. For example, training of the initial baseline model may include relatively less gameplay data compared to the amount of gameplay data (e.g., thousands of gameplay sessions) associated with other model training techniques. For example, aspects of the present disclosure include training an initial baseline model and performing categorization (e.g. evaluate an accuracy percentage level according to different model actions). If the accuracy percentage level associated with the baseline model is greater than or equal to a threshold percentage, the baseline model may be deployed as described herein. If not, aspects of the present disclosure include retraining the baseline model on a larger data set(s), utilizing larger random forest trees (RFTs), and/or modifying other settings of algorithms associated with the initial baseline model.

In some aspects, training of the initial baseline model may be performed in association with training specifications that are based on the size of data (e.g., training data) available. In an example, after training of the initial baseline model, the initial baseline model may be applied to generate a prediction (e.g., gameplay decision, gameplay outcome, etc.) during a gameplay session. Upfront, the initial baseline model predicts what will happen in an event X. Once the event X occurs, the gaming server 116 may compare the actual outcome associated with the event X to the predicted outcome. The gaming server 116 may continuously compare actual outcomes to predicted outcomes, which may support continuously measuring the accuracy of the model.

In some aspects, the general playstyle of the target player may be known. For example, a quantity of recorded gameplay decisions by the player may be greater than or equal to a first threshold quantity for gameplay decisions. In another example, a quantity of recorded gameplay sessions by the target player may be greater than or equal to a first threshold quantity for gameplay sessions. In another example, a cumulative duration associated with gameplay sessions by the target player may be greater than or equal to a first threshold duration.

In some other examples, determining whether the general playstyle of the target player is known may include a first training of a first initial baseline model, testing the initial baseline model (e.g., seeing predicted values), a second training of an initial baseline model (or retraining of the initial baseline model), testing the second initial baseline model, and determining a percentage delta between the different initial baseline models.

Based on the comparison, for example, the gaming server 116 may determine a stability and/or accuracy associated with the models. Accordingly, for example, aspects of the present disclosure may support evaluating a dynamic tendency (e.g., a dynamic percentage), based on multiple comparisons. For example, if the change between the first training and the second is below a threshold (e.g., below 20%), the gaming server 116 may determine that the training data is accurate enough for training the initial baseline models.

In some other cases, however, there may not be enough historical gameplay data to complete the creation and/or training of the baseline model. For example, the quantity of recorded gameplay decisions by the target player may be less than to a second (higher) threshold quantity for gameplay decisions. In another example, the quantity of recorded gameplay sessions by the player may be less than a second (higher) threshold quantity for gameplay sessions, a cumulative duration associated with gameplay sessions by the target player is less than a second (higher) threshold duration, etc. In another example, the gaming server 116 (e.g., machine learning engine 141) may additionally use data (e.g., gameplay data) from players with a similar playstyle as the target player or from a similar market as the target player to create and/or train the baseline model.

In an example, the gaming server 116 (e.g., machine learning engine 141) may create and/or train the baseline model using gameplay data, in which a portion (e.g., X %, as much data as available or previously captured) of the gameplay data is from the target player and a remaining portion (e.g., Y %) of the gameplay data is from players with a similar playstyle or from a similar market. For example, the gaming server 116 (e.g., machine learning engine 141) may create and/or train the baseline model using gameplay data from the target player and the other players, in which: the total quantity of recorded gameplay decisions (by the player and the other players) is greater than or equal to a threshold the second (higher) threshold quantity for gameplay decisions; the total quantity of recorded gameplay sessions (by the player and the other players) is greater than or equal to a threshold the second (higher) threshold quantity for gameplay sessions; and/or the total cumulative duration associated with gameplay sessions (by the player and the other players) is greater than or equal to a threshold the second (higher) threshold duration.

Accordingly, for example, in the case in which the quantity of recorded gameplay decisions by the target player is less than a second (higher) threshold quantity for gameplay decisions, aspects of the present disclosure may support using "missing" data based on a "usual" or "average" or "similar" player. For example, the gaming server 116 may apply as much data as available from a specific cluster/player and fill it with "default"/"similar" behavior so as to meet the second (higher) threshold and provide an initial baseline model. Then, over time, the accuracy of the model may be increased as additional input data (e.g., gameplay data, sensor data, etc.) is acquired. In some aspects, the accuracy of the model may be determined based on a percentage delta (e.g., a dynamic percentage) as described above.

In some aspects, the baseline models described herein may be venue-based. For example, a venue (e.g., a casino venue, a video lottery venue, an online gaming venue, an amusement with prize venue, etc.) may track gameplay behaviors for all players (e.g., all registered players, all non-registered players, etc.). Using the gameplay behaviors for all players, the gaming server 116 (e.g., machine learning engine 141) may create and train a "standard baseline model" associated with the venue. Accordingly, for example, when creating a new baseline model for a player, the gaming server 116 (e.g., machine learning engine 141) may train the baseline model based on the "standard baseline model."

Additionally, or alternatively, the baseline models described herein may be market-based. For example, the gaming server 116 (e.g., machine learning engine 141) may track gameplay behaviors for all players (e.g., all registered players, all non-registered players, etc.) at all venues included in a gameplay market. In an example, the gameplay market may be associated with a geographical region, a casino type, a set of game types, etc. Using the gameplay behaviors for all players at all venues in the gameplay market, the gaming server 116 (e.g., machine learning engine 141) may create and train a "standard baseline model" associated with the gameplay market.

In some cases, the baseline models (and self-evolvement thereof) described herein may be created and/or trained using gameplay data and/or sensor data acquired from a pool of players included among players of various genders, ethnicities, physical feature characteristics (skin tone, facial features, etc.), or the like. Accordingly, for example, aspects of the baseline models may support reduced bias (e.g., a reduced difference between the average prediction by a model and the correct value the model is trying to predict) and/or reduced variance (e.g., a reduced variability of model prediction for a given data point).

Aspects of the present disclosure may support validating (e.g., verifying) a baseline model using player feedback. In an example, the baseline model may be validated based on player feedback associated with performance results of the baseline model. For example, a player may evaluate the baseline model based on whether recommended actions (e.g., proposed gameplay decisions by the baseline model) by the gameplay model, gameplay results achieved by the baseline model, resulting emotional state of the player, etc. are satisfactory to (e.g., approved by) the player. In some aspects, the gaming server 116 may provide a questionnaire (e.g., via the gaming device 108, a communication device 144, via a physical form, etc.) to the player, via which the player may score or rank the performance of the baseline model. In an example, the questionnaire may include inquiries whether the recommended actions, gameplay results, etc. achieved using the baseline model have had an effect (e.g., positive, negative, no effect, etc.) on an emotional state of the player. Additionally, or alternatively, validating (e.g., verifying) the baseline model may include monitoring emotional states of the player (e.g., using sensor data described herein) with respect to the performance results of the baseline model.

Accordingly, for example, using player feedback provided in the questionnaire (e.g., with or without monitoring emotional states of the player), aspects of the present disclosure may support model creation and training techniques that use relatively less gameplay data compared to other model creation and training techniques.

In another example implementation, the gaming system 100 may support different playstyle models available for the same player based on game type and/or gaming device 108. In some aspects, the gaming system 100 may support the application of different playstyle models across different game types.

For example, the gaming system 100 may support different respective models (e.g., baseline models, playstyle models, emotion prediction models, etc.) for electronic slot games vs. partial-electronic stepper games vs. other gaming machine-like devices. In an example, the gaming system 100 may support models (e.g., baseline models, playstyle models, emotion prediction models, etc.) that are tied towards themes of respective games. For example, the gaming system 100 may support a model(s) specific to a game "Ghost Busters" and a different model(s) specific to a game "American gods".

In some examples, for a given game, the gameplay behavior of a baseline model tied to the game may be related to a character associated with the game or game theme, rather than a "random" playstyle. In some cases, when a player initiates a new gameplay session at a gaming device 108 in association with a given game, the player may select a character from the game theme, based on which the gaming server 116 may apply a playstyle model (e.g., a baseline playstyle model corresponding to the character) to the gameplay session. For example, when the player initiates a gameplay session associated with a game (e.g., "Ghost Busters," "American gods," etc.), the gaming server 116 (or the gaming device 108 or the communication device 144) may auto-execute a baseline playstyle model corresponding to the game and/or the game theme.

In an example, the baseline playstyle model may start with the playstyle (e.g., gameplay behavior) corresponding to the selected character, and over time (e.g., during the gameplay session, after a quantity of gameplay events, gameplay decisions, and/or gameplay results), the playstyle model may evolve such that the playstyle (e.g., gameplay behavior) better matches (e.g., within a similarity threshold) the player's playstyle. In some aspects, the playstyle model may evolve while maintaining essential gameplay behavior associated with the initially selected character.

In another example implementation, the gaming system 100 may support the storage of playstyle models (e.g., baseline playstyle models and/or modified playstyle models described herein) to a communication device 144 or other device (e.g., a portable memory device) of a player. That is, for example, the gaming server 116 may support a "wallet-like" storage of playstyle models.

In an example, the gaming system 100 may support applying any of the playstyle models to a gameplay session at a gaming device 108 based on data exchange or data sharing of the playstyle models. For example, the gaming server 116 (or gaming device 108) may detect and/or access playstyle models stored at a memory a communication device 144 based on a "card in" event at the gaming device 108 using the mobile application. In another example, the gaming server 116 (or gaming device 108) may detect and/or access playstyle models stored at the other device based on an insertion of the other device into the gaming device 108, establishment of a wired connection or wireless connection (e.g., NFC data exchange, Bluetooth, Infrared, WiFi, etc.) between the other device and the gaming device 108, etc.

In some aspects, the gaming system 100 may support executing a playstyle model stored at a communication device 144 (or some portable memory device) when applying the playstyle model to a gameplay session at a gaming device 108. In some examples, the gaming system 100 may support setting permissions for the playstyle models stored at a communication device 144 (or some portable memory device) such that some of the playstyle models are available for execution only for specific game themes, game types, gaming venues, gaming markets, etc.

In an example, the playstyle models may remain on a communication device 144 (or other device of the player) and be accessible by the gaming system 100, rather than being stored on the gaming server 116. For example, the communication device 144 (e.g., via the mobile application) may enable access by the gaming server 116 to a playstyle model stored on the communication device 144, based on a player selection of a playstyle model.

Alternatively, or additionally, the communication device 144 may include a machine learning engine capable of implementing the stored playstyle models. For example, the communication device 144 may include a machine learning engine that includes aspects of the machine learning engine 141 described herein. The machine learning engine of the communication device 144 (and playstyle models stored at a memory of the communication device 144) may provide automated player inputs and or propose gameplay decisions as described herein. In an example, the communication device 144 may output decision data associated with the automated player inputs and or proposed gameplay decisions to the gaming device 108. The gaming device 108 may implement the player inputs and/or gameplay decisions based on the decision data from the communication device 144.

The mobile application may support the viewing, creation, and/or configuration of playstyle models by a player. For example, the mobile application may support the configuration of new auto play models (e.g., define characteristics, connect to gaming device 108, execute). In some aspects, the mobile application may support player selection of a playstyle model and applying the playstyle model to a gameplay session.

In some aspects, the mobile application may support viewing of the evolvement status of a playstyle model. In some examples, the mobile application may visually indicate the evolvement status using a picture of a virtual character, experience points earned, a progress level (or percentage) associated with a playstyle model, or the like. In some other examples, the mobile application may visually indicate other status details of the playstyle model (e.g., time played, games played, game types played, etc. when using the playstyle model). In some aspects, the playstyle model may be viewable (e.g., using the mobile application) outside of a gaming venue, such as at a player's residence.

In an example, the mobile application may support reviewing characteristics or "personalities" associated with each playstyle model. For example, the mobile application may support assignment (e.g., by a player) of identification information such as names, avatars, images, etc. to the playstyle models. In some other aspects, the mobile application may support viewing, creation, and/or configuration of characteristic data corresponding to the playstyle models. For example, the mobile application may support fine-tuning (e.g., by the player, a casino operator, etc.) of one or more behavioral parameters of a playstyle model. In some aspects, the mobile application may support feeding the playstyle model with additional information or desires (e.g., configurations, desired emotional states, desired entertainment value, etc.) of the player.

In some aspects, the mobile application may support the viewing of emotional states (and changes in emotional states) of the player in association with playstyle models. For example, the mobile application may support the viewing of emotional states (and changes in emotional states) with respect to different instances (e.g., gameplay sessions, gameplay session temporal information, etc.) in which the playstyle models were selected and applied. In some cases, the mobile application may support viewing of changes to (e.g., evolvement of) the playstyle models. For example, the mobile application may support viewing of changes to the playstyle models compared to changes in emotional states of the player.

In some cases, the characteristic data may include textual data input by a player with respect to a playstyle model. For example, the textual data input by a player may include player notes regarding use, gameplay preferences, etc. of a playstyle model. In some examples, the textual data input by a player may include player self-assessments regarding emotional states of the player when using the playstyle model. In some other cases, the characteristic data may include emotional states of a player as determined by the gaming server 116 (e.g., machine learning engine 141) using sensor data described herein. Additionally, or alternatively, the characteristic data (e.g., textual data) may be input by any authorized user (e.g., a casino operator, etc.).

In some other cases, the characteristic data may include usage data and/or performance data of with respect to a playstyle model, provided by the gaming server 116, the gaming device 108, and/or a communication device 144. For example, the usage data may include temporal information and/or usage information (e.g., dates/times a playstyle model was used, how often a playstyle model has been used within a temporal period, game types for which a playstyle model has been applied) associated with each playstyle model.

The performance data of a playstyle model may correspond to previous gameplay sessions. In an example, the performance data may include win/loss information associated with a playstyle model. In some cases, the win/loss information may be with respect to game type, with respect to gaming device 108 (e.g., a favorite gaming device 108 of the player), etc. Aspects of the present disclosure may support updating playstyle models based on gameplay associated with a current gameplay session and/or emotional state(s) of a player in association with the current gameplay session. For example, the gaming system 100 may support updating of the playstyle models in real-time according to gameplay associated with a current gameplay session and/or emotional state(s) of a player in association with the current gameplay session. In another example, the gaming system 100 may support updating of the playstyle models at the completion of a current gameplay session.

Aspects of the mobile application described herein may be implemented at a gaming device 108. For example, after a "card in" event using a communication device 144 or other device of a player, the player may view, create, configure, select, and/or apply playstyle models as described herein, via a user interface of the gaming device 108.

Additional or alternative to being stored on a communication device 144, the playstyle models (e.g., baseline models, modified playstyle models, etc.) described herein may be linked to a player casino account (e.g., linked to a player's tracking card, a player biometric identifier, etc.).

In another example implementation, a communication device 144 (e.g., a player's mobile device) may learn/improve a personalized player model stored on the communication device 144 (or stored on a memory coupled to the communication device 144). The communication device 144 may learn/improve the player model on a continuous basis and/or a semi-continuous basis (e.g., based on a temporal interval). Additionally, or alternatively, the communication device 144 may learn/improve the player model based on a trigger condition (e.g., based on a quantity of gameplay decisions, a quantity of gameplay results, a quantity of gameplay sessions, total gameplay duration over one or more gameplay sessions, etc.). The communication device 144 may use the personalized player model when playing new games for several example reasons: auto-play different devices (e.g., electronic table game (ETG), slot, etc.) using the personalized player model, receive game recommendations based on the personalized player model and associated playstyle preferences, and receive promotional opportunities. Accordingly, for example, the communication device 144 may deploy the personalized player model for different game types, different gaming devices 108, etc.

In another example implementation, the gaming system 100 may support ranking and advertising of different playstyle models associated with different players. For example, the gaming system 100 may support player improvements to player profiles (e.g., achieving higher player rankings, higher value profiles, etc.) based on gameplay data (e.g., positive gameplay results). If a player reaches a new level (e.g., achieves a higher rank) through gameplay, the gaming server 116 may determine and provide an award (e.g., "Hall of Fame" status, etc.) to the player. Accordingly, for example, the player may be educated by the model system described herein to play according to a certain playstyle in order to level up.

In some aspects, player rankings supported by the gaming system 100 may be provided to a player based upon gameplay data of the player (e.g., how the player plays). Some example factors associated with calculating player rankings include: rate of play, wagering amount, actions after specific events (e.g., win streak, lose streak, bonus trigger, high win, low win, etc.), or the like.

In another example implementation, the gaming system 100 may support auto play modes in which an auto play mode using a personalized player model (e.g., a data model(s) 142) may be deployed across multiple games and game types (e.g., in a gaming venue, a gaming market, etc.). For example, aspects of the present disclosure support, for new games on a casino floor (e.g., games that a player has no experience playing or relatively low experience playing), deploying a personalized player model to test and recommend/rank the games in a "Find your Game" fashion. For example, the gaming system 100 may support deploying the personalized player model (e.g., using a mobile application on a communication device 144) across the games. The gaming server 116 (or mobile application) may generate a report and provide the same to the player. In an example, the report may include information (e.g., game rankings) that may direct the player to more positive experiences (e.g., relatively positive emotional states as predicted by the personalized player model, relatively positive gameplay results as predicted by the personalized player model, etc.) based on the personalized player model.

In some examples, the personalized player model may be stored in a wallet-like mobile application (e.g., at the communication device 144), and the top recommended games for the player could be listed therein, proposed by the personalized player model. In some aspects, the personalized player model may rate each game (e.g., 1 out of 5 stars, from a range of 1 to 10, etc.) for the player. Accordingly, for example, the gaming system 100 may support proposing (e.g., by the personalized player model) games and/or game types to the player, even if the player has no prior knowledge of the games.

In some examples, the mobile application may support locating a proposed game(s) using a graphical representation (e.g., a map) and directions (e.g., navigation directions, text directions, etc.) for locating the proposed game(s). In some aspects, the mobile application may display an image representative of the proposed game(s) and descriptive information (e.g., game type, wager information, payout information, etc.) associated with the proposed game(s). Accordingly, for example, the mobile application may direct a player to the proposed game(s) on a gaming floor (e.g., using any combination of haptic notifications, audio notifications, visual notifications, text-based notifications, etc.), which may provide improved player experience and increase player turnout at a gaming venue. Such example aspects may provide advantages for relatively larger gaming venues (e.g., properties) having, for example, thousands of gaming devices 108.

The gaming system 100 may support multiple games to be played on a gaming device 108 at the same time. For example, the gaming system 100 may support auto play modes in which the multiple games are respectively played at a gaming device 108 using multiple playstyle models (e.g., a baseline playstyle model, a modified playstyle model corresponding to the player, etc.). In an example, a gaming device 108 may include a user interface (e.g., a single display) or multiple user interfaces (e.g., multiple displays) via which the multiple games are viewable.

In some aspects, the gaming system 100 may support player selection of a proposed gameplay decisions or a different gameplay decision (e.g., the player's own decision). In some other aspects, the gaming system 100 may support player selection of any combination of proposed gameplay decisions and a player's own gameplay decision.

In another example implementation, the gaming system 100 may support providing (e.g., by the gaming server 116) notifications indicating predicted gameplay parameters associated with a playstyle model applied to an auto play mode. In an example, the predicted gameplay parameters may include a predicted gameplay duration (e.g., amount of time until gameplay credits are exhausted) associated with the playstyle model, a predicted risk factor (e.g., risk level) associated with the playstyle model, average gameplay credits spent over a time period when applying the playstyle model, and/or a recommendation of how much money to insert to secure a desired amount of time at a gaming device 108.

In an example, the gaming server 116 may provide a set of different playstyle models to a player in association with a gameplay session. Each playstyle model may be associated with its own characteristics (e.g., "spend as much as possible to win as big as possible" or "low spender to increase time on device"). In an example, for each selectable playstyle model at a gaming device 108, the gaming device 108 may display the "average time on device" based on the available gameplay credits (e.g., cash amount) on the credit meter of the gaming device 108.

Accordingly, for example, the gaming server 116 may support selectable playstyle models corresponding to estimated gameplay durations (e.g., durations preferable by a player). For example, the gaming device 108 may output proposed gameplay decisions based on a selected playstyle model, and the gaming device 108 may display an estimated gameplay duration that may be achievable at the gaming device 108 if the proposed gameplay decisions are selected by the user. In another example, based on a selected playstyle model, the gaming server 116 may implement gameplay decisions at the gaming device 108 up to a corresponding estimated gameplay duration (e.g., the playstyle model may play on the player's behalf while the player watches, and the estimated gameplay duration may be reached by watching the model play).

In some aspects, the predicted gameplay parameters (e.g., estimated gameplay duration) associated with a playstyle model may be supportive of responsible gaming actions within a casino environment. For example, the predicted gameplay parameters may provide a player with insight into the volatility of the player's gameplay behavior.

In another example implementation, the gaming system 100 may support autonomous and/or semi-autonomous wager modifications (e.g., increases, decreases) at a gaming device 108 based on an applied playstyle model (or evolvement of the playstyle model) and a result associated with a gameplay decision (e.g., game outcome). For example, the gaming system 100 may support a playstyle-based "Bet" button at a gaming device 108 (e.g., on a digital button panel). In some aspects, the gaming system 100 may support player selection of a playstyle model to be applied to the playstyle-based "Bet" button.

In an example, gameplay behavior associated with the playstyle model may be applied to a gameplay session at each instance of selecting the playstyle-based "Bet" button. In an example, consecutive or semi-consecutive selection of the playstyle-based "Bet" button may automatically adjust bet behavior (e.g., a wager amount) in accordance with the corresponding playstyle model and emotional state of the player. Accordingly, for example, consecutive or semi-consecutive selection of the playstyle-based "Bet" button may automatically apply a wager amount, a betting decision, etc. based on the playstyle model and the emotional state of the player.

Accordingly, for example, the playstyle-based "Bet" button may function as a smart "Repeat Bet" button at a gaming device 108. At each instance of pressing the playstyle-based "Bet" button, a player confirms that he/she "accepts" the gameplay behavior associated with the playstyle model. In some aspects, the gaming system 100 may support player inputs which alternate between selecting the playstyle-based "Bet" button or a "regular" spin button (e.g., according to a player preferred wager amount and/or gameplay decision).

In some aspects, the gaming system 100 may support player activation of the playstyle-based "Bet" button during a gameplay session. For example, the gaming system 100 may support player activation of the playstyle-based "Bet" button in accordance with a dynamic auto play mode as described herein.

Aspects of the present disclosure may be applied to game types other than those associated with gaming devices 108. For example, the gaming system 100 may support application of the auto play modes and playstyle models described herein to a sports betting environment. In some aspects, the gaming server 116 (e.g., machine learning engine 141) may support processing any combination of data associated with a sporting event (e.g., athlete performance, athlete performance statistics, team performance, team statistics, previous game results, etc.) and player decisions (e.g., wager amounts, wager parameters, etc.) associated with the sporting event. The gaming server 116 may generate any number of playstyle models corresponding to player decisions in relation to a sporting event. In some cases, the gaming system 100 may support proposed gameplay decisions associated with sports wagers such as micro events (e.g., micro-betting).

Figure 2:
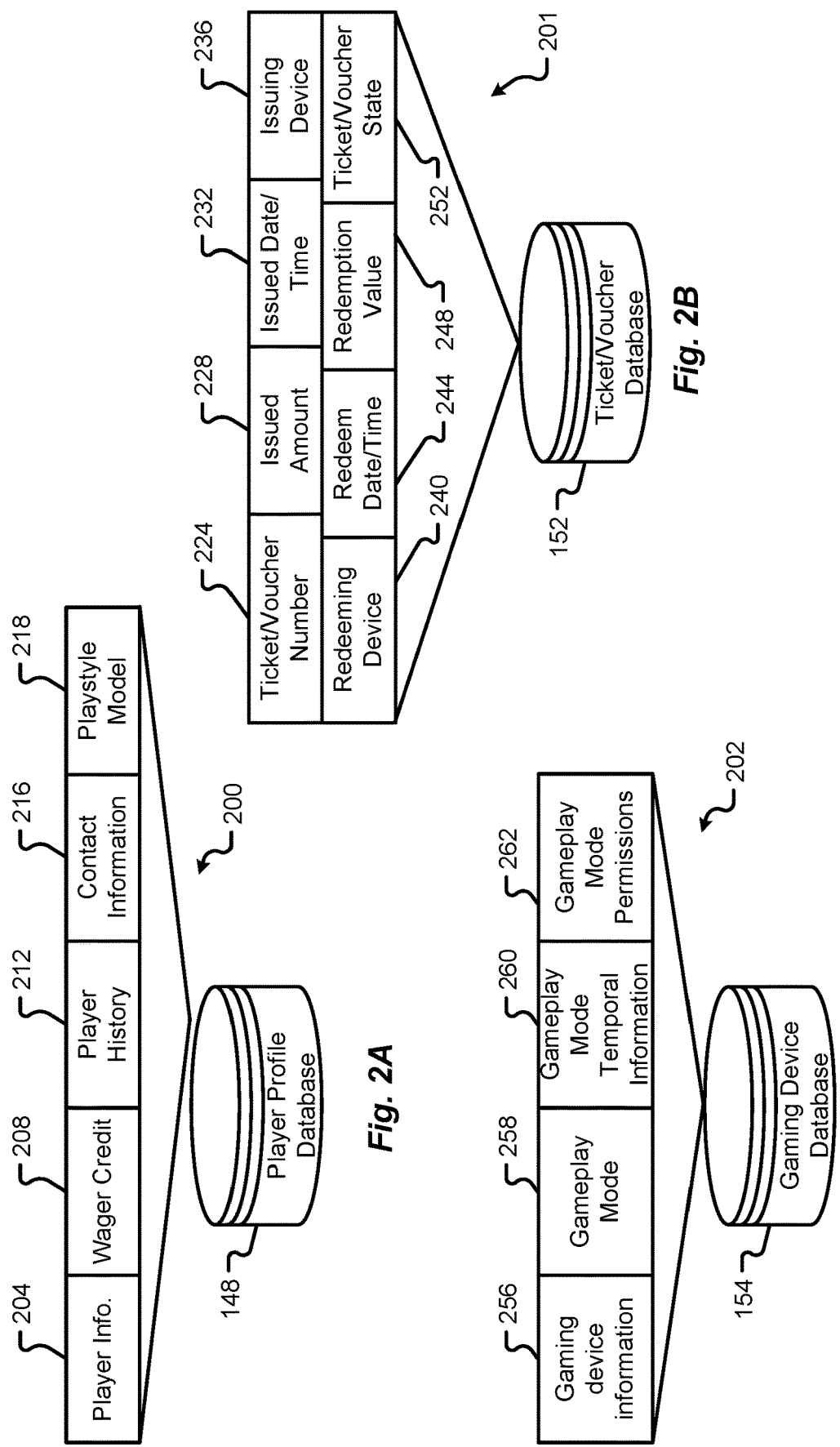
FIG. 2A is a block diagram illustrating a first example data structure used in accordance with aspects of the present disclosure.
FIG. 2B is a block diagram illustrating a second example data structure used in accordance with aspects of the present disclosure.
FIG. 2C is a block diagram illustrating a third example data structure used in accordance with aspects of the present disclosure.

With reference now to FIGS. 2A through 2C, additional details of data structures that are useable in connection with managing auto play modes and playstyle models (e.g., baseline models, self-evolving playstyle models, modified playstyle models) at a gaming device will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, and/or a communication device 144 without departing from the scope of the present disclosure.

With reference initially to FIG. 2A, details of a data structure 200 that may be maintained as part of a player profile will be described in accordance with at least some embodiments of the present disclosure. The database 148 may be configured to store one or multiple data structures 200 that are used in connection with tracking player progress and gaming history. In some embodiments, the data stored in the data structure 200 may be stored for a plurality of different player profiles or for a single player profile. As a non-limiting example, the data structure 200 may be used to store player loyalty information, player history information, and the like. Even more specifically, the data structure 200 may include a plurality of data fields that include, for instance, a player information field 204, a wager credit field 208, a player history field 212, a contact information field 216, and a playstyle model field 218.

The player information field 204 may be used to store any type of information that identifies a player or a group of players. In some embodiments, the player information field 204 may store one or more of username information for a player 112, password information for a player account, player status information, accommodations associated with the player 112, and any other type of customer service management data that may be stored with respect to a player 112.

The wager credit field 208 may be used to store data about the available credit of a player 112 with a device, with a sports book, with a casino, and/or with a plurality of casinos. For instance, the wager credit field 208 may store an electronic record of available credit in the player's account and whether any restrictions are associated with such credit. The wager credit field 208 may further store information describing a player's available credit over time, cash out events for the player, winning events for the player 112, wagers placed by the player 112, tickets/vouchers issued to the player 112, and the like.

The player history field 212 may be used to store historical data for events that occur with respect to the player 112. For example, the player history field 212 may store information associated with the player 112 in relation to an outcome in a game of chance, an outcome in a game of skill, a celebration event for a person other than the player 112, involvement in a celebration event, visits to a predetermined location, gameplay information with respect to a particular game, player interactions with a communication device 144, player interactions (e.g., gameplay decisions, player feedback with respect to a baseline playstyle model, etc.) with a gaming device 108, wagers placed by the player 112, tickets/vouchers issued for the player 112, tickets/vouchers redeemed by the player 112, etc.

In some other examples, the player history field 212 may store user decisions by the player 112 in relation to instances of setting parameters of an auto play mode for a gaming device 108 (e.g., duration, quantity of plays, a cash-out threshold, whether the auto play mode is fully autonomous or semi-autonomous, etc.), invoking the auto play mode at the gaming device 108, pausing the auto play mode, bypassing the auto play mode (e.g., inputting a gameplay decision different from a proposed gameplay decision, refraining from pressing the playstyle-based "Bet" button described herein, etc.), and/or terminating the auto play mode.

In some aspects, the player history field 212 may store sensor data (e.g., biometric data, pressure sensor data, etc. described herein) associated with a player in relation to gameplay sessions. For example, the player history field 212 may store sensor data associated with gameplay data (e.g., gameplay behavior, gameplay decisions, selections of a playstyle model, etc.) and/or gameplay events (e.g., gameplay decision events, gameplay outcomes, gameplay recommendations or predictions by a playstyle model, etc.). In some examples, the player history field 212 may store emotional states calculated and/or predicted (e.g., by an emotion prediction model described herein) based on the sensor data. For example, the player history field 212 may store emotional states (and changes in emotional states) of a player with respect to different instances (e.g., gameplay sessions, gameplay session temporal information, etc.) in which playstyle models (e.g., baseline playstyle models, modified playstyle models, etc.) were selected and applied.

The contact information field 216 may store information associated with a preferred mode(s) of contact for the player 112 and how such contact can be made. For instance, the contact information field 216 may store information such as an email address, phone number, room number, player loyalty number, address, etc.

The playstyle model field 218 may store user decisions by the player 112 in relation to instances of selecting playstyle models for an auto play mode. In some aspects, for a player profile corresponding to the player 112, the playstyle model field 218 may include a list of playstyle models associated with the player profile. For example, the playstyle model field 218 may include a list of stored playstyle models (e.g., stored at the memory 124 of the gaming server 116, stored at the player profile database 148, stored at the gaming device database 154, etc.). In some examples, for a playstyle model stored at a communication device 144 of the player 112, the playstyle model field 218 may include identifying information associated with the playstyle model, without the model data included in the playstyle model.

In some aspects, the playstyle model field 218 may store data (e.g., characteristics, features, use history, modifications, etc.) associated with playstyle models described herein. For example, the playstyle model field 218 may store data associated with baseline models, modified versions of the playstyle models, or the like. In some examples, the playstyle model field 218 may store accuracy information associated with predictions generated by a playstyle model with respect to an action (e.g., a proposed gameplay decision, predicted gameplay behavior, etc.).

With reference now to FIG. 2B, details of another data structure 201 that may be used within the gaming system 100 will be described in accordance with at least some embodiments of the present disclosure. The database 152 may be configured to store one or multiple data structures 201 that are used in connection with tracking ticket/voucher status, value, and the like. In some cases, the data structures 201 may be used in connection with tracking credits associated with a gameplay session at a gaming device 108. In some other cases, the data structures 201 may be used in connection with tracking credits earned and/or credits lost at a gaming device 108 in association with an invoked auto play mode, a playstyle model applied to the auto play mode, a modified (e.g., evolved) playstyle model applied to the auto play mode, etc. In some other cases, the data structures 201 may be used in connection with tracking credits earned and/or credits lost at a gaming device 108 in association with different emotional states of a player.

In some embodiments, the data stored in the data structure 201 may be stored for a plurality of different tickets/vouchers and may or may not be organized based on events, player association, etc. As a non-limiting example, the data structure 201 may be used to store ticket/voucher status information, ticket/voucher value information, and the like. The ticket/voucher value information may include credit information associated with a gameplay session at a gaming device 108.

In an example, the data structure 201 may include a plurality of data fields that include, for instance, a ticket/voucher number field 224, an issued amount field 228, an issued date/time field 232, an issuing device field 236, a redeeming device field 240, a redeem date/time field 244, a redemption value field 248, and a ticket/voucher state field 252. It should be appreciated that the data structure 201 may have greater or fewer fields than depicted in FIG. 2B.

The ticket/voucher number field 224 may be used to store a unique validation number assigned to the ticket/voucher when a ticket/voucher is issued to a player 112. In some embodiments, the data stored in the ticket/voucher number field 224 may be randomly generated, pseudo-randomly generated, or sequentially generated based on when the ticket/voucher is issued. In some embodiments, the validation number assigned to the ticket/voucher may be unique to the ticket/voucher within the gaming system 100 (e.g., at least unique as to any other ticket/voucher issued within the gaming system 100). While numeric values may be used for the validation number, it should be appreciated that any alphanumeric string may be used for the validation number stored in the ticket/voucher number field 224.

The issued amount field 228 may be used to store an electronic record of a monetary value for which the particular ticket/voucher was issued. The issued amount field 228 may correspond to a data field that is written once and not updated. Thus, even when an associated ticket/voucher transitions from the issued state to another state, the value recorded in the issued amount field 228 may be left unchanged. Likewise, the information stored in the issued date/time field 232 and issuing device field 236 may also be written once and not changed thereafter. The issued date/time field 232 may store information describing when a ticket/voucher is issued, whereas the issuing device field 236 may store information describing where a ticket/voucher is issued. For instance, the issuing device field 236 may indicate a unique serial number assigned to a gaming device 108 that was used to issue the ticket/voucher to the player 112 and the issued date/time field 232 may store the time at which the ticket/voucher was issued by the gaming server 116 and/or the gaming device 108.

In some embodiments, the date/time field 232 may be populated based on a clock of the gaming device 108 that issued the ticket/voucher rather than relying on the clock of the gaming server 116. Said another way, when a gaming device 108 issues a ticket/voucher, such information may be communicated back to the gaming server 116 along with a timestamp provided by the gaming device 108 to indicate a time at which the gaming device 108 issued the ticket/voucher. Using the time indicated by the gaming device 108 can help account for or avoid problems associated with delays in communication over the communication network 104. One such possible problem would be having a wagered event (e.g., a sporting event) come to completion while the communication network 104 is down or unavailable and before the gaming server 116 becomes aware of an issued ticket/voucher by a gaming device 108. Alternatively, or additionally, it may also be possible or desirable to use the clock of the gaming server 116 as the centralized authority on all date/times entered into the field 232, thereby avoiding the need to synchronize or consider synchronization issues between different gaming devices 108.

Like the issuing device field 236, the redeeming device field 240 may be used to store information describing a device at which a ticket/voucher is redeemed by a player 112. Alternatively, or additionally, the redeeming device field 240 may be used to store information describing a communication device 144 via which a player 112 may redeem credits associated with a gameplay session or a player profile. In some embodiments, a device used for redeeming a ticket/voucher or credits may correspond to a gaming device 108 or a communication device 144.

A player 112 may redeem a ticket/voucher at a gaming device 108 by inserting a printed ticket/voucher into a ticket acceptance device of the gaming device 108 (e.g., similar to a bill acceptor). A player 112 may redeem a ticket/voucher at a communication device 144 by scanning the ticket/voucher with a camera of the communication device 144 and transmitting information obtained from the scan of the ticket/voucher back to the gaming server 116 as proof of redemption. Alternatively, or additionally, in the example case of an electronic ticket/voucher (e.g., an e-TITO voucher), a player 112 may to redeem the electronic ticket/voucher at a gaming device 108 or a communication device 144 by using an RFID reader that is in electronic communication with (e.g., electrically coupled to) the gaming device 108 or the communication device 144.

Thus, the redeeming device field 240 may store information uniquely describing the device used by the player 112 to redeem a ticket/voucher (e.g., an address or device ID). Alternatively or additionally, the redeeming device field 240 may store information describing a type of device that was used for redemption (e.g., whether the device is a gaming device 108 or a communication device 144).

The redemption date/time field 244, similar to the issued date/time field 232, may be used to store data and/or time information for the ticket/voucher. For example, the redemption date/time field 244 may be used to store a date/time when a ticket/voucher is redeemed as opposed to when the ticket is issued. Again, the time indicated in the field 244 may be based on a timestamp issued by the redeeming device and/or a clock of the gaming server 116. The date/time provided in the data field 244 may correlate to a date/time when the state of the ticket transitions within the ticket/voucher state field 252.

When the electronic record of the ticket/voucher state 252 is updated, a change to the date/time in field 244 may also be made at substantially the same time. As will be discussed in further detail herein, the ticket/voucher state field 252 may be used to store state or status information for a ticket/voucher and the state within the field 252 may be capable of having at least three different values (e.g., issued, redeemable, and redeemed). Other possible values for the state of the ticket/voucher may include, without limitation, a pending state, which may correspond to a state between the issued state and the redeemable state where a wagered event has come to completion but the redeemable value of the ticket/voucher is still being determined and/or considered.

The redemption value field 248 may be used to store an electronic record indicating an amount for which a ticket/voucher may be redeemed (e.g., a redeemable value) and/or an amount for which a ticket/voucher is actually redeemed (e.g., a redeemed/redemption amount). In embodiments where the redeemable value is the same as the redeemed/redemption value, there may only need to be a single data field 248 to store the redemption value for the ticket/voucher. In some embodiments, it may also be desirable to have separate data fields to store a redeemable value for a ticket/voucher and then a redeemed/redemption value for the ticket/voucher. The redeemable value for a ticket/voucher may be determined by the gaming server 116 as soon as the wagered event for which the ticket/voucher is associated has come to completion whereas the redemption value may be determined by the gaming server 116 when the ticket/voucher is redeemed. Again, the redemption value may be the same as or different from the redeemable value without departing from the scope of the present disclosure.

With reference to FIG. 2C, details of a data structure 202 that may be maintained as part of a gaming device profile will be described in accordance with at least some embodiments of the present disclosure. The gaming device database 154 may be configured to store one or multiple data structures 202 that are used in connection with tracking a gameplay mode of a gaming device 108. In some embodiments, the data stored in the data structure 202 may be stored for a plurality of different gaming devices 108 or a single gaming device 108. As a non-limiting example, the data structure 202 may be used to store gaming device information, gameplay play mode information, and the like. Even more specifically, the data structure 202 may include a plurality of data fields that include, for instance, a gaming device information field 256, a gameplay mode field 258, a gameplay mode temporal information field 260, and a gameplay mode permissions field 262.

The gaming device information field 256 may be used to store any type of information that identifies a gaming device 108 or a group of gaming devices 108. In some embodiments, the gaming device information field 256 may store identification information for a gaming device 108 (e.g., a unique serial number assigned to the gaming device 108) and any other type of gaming device management data that may be stored with respect to a gaming device 108.

The gameplay mode field 258 may be used to store any type of information associated with a gameplay mode (e.g., an auto play mode) of a gaming device 108 or a group of gaming devices 108. In some embodiments, the gameplay mode field 258 may store information indicating whether a gaming device 108 is in a fully-autonomous auto play mode or a semi-autonomous auto play mode. In some examples, the gameplay mode field 258 may store information indicating playstyle models associated with an auto play mode. For example, the gameplay mode field 258 may store information indicating playstyle models available for an auto play mode, an active playstyle model associated with an auto play mode, etc. In some aspects, the gameplay mode field 258 may store information indicating baseline models (e.g., baseline playstyle models, baseline emotion prediction models, etc.) available for and/or applied to an auto play mode, modified (self-evolved) playstyle models available for and/or applied to an auto play mode, or the like.

The gameplay mode temporal information field 260 may store date/time information describing when a gameplay mode (e.g., an auto play mode) is invoked at a gaming device 108. In some aspects, the gameplay mode temporal information field 260 may store information describing a duration (e.g., an initially set duration, an extended duration, a remaining duration) associated with an auto play mode invoked at the gaming device 108. In an example, the gameplay mode temporal information field 260 may store a time associated with disabling the auto play mode at the gaming device 108. In some aspects, the gameplay mode temporal information field 260 may include time periods during which auto play mode may be made available (e.g., as set by a casino) to a player.

The gameplay mode permissions field 262 may store permissions information describing whether a gameplay mode (e.g., an auto play mode) may be invoked at a gaming device 108. For example, the gameplay mode permissions field 262 may store permissions information describing whether a player may invoke an auto play mode at the gaming device 108. In an example, the permissions information may indicate whether invoking the auto play mode is available to players satisfying a membership status (e.g., player club status) or higher or whether invoking the auto play mode is regardless of membership status (e.g., available to any player). In another example, the permissions information may indicate whether invoking the auto play mode is available as a free feature to all players or as a paid feature (e.g., fee-based). In some other examples, the permissions information may indicate whether invoking the auto play mode is available when a player satisfies a set of gameplay criteria (e.g., a threshold quantity of plays, a threshold duration of gameplay, etc.).

In some cases, the permissions information may indicate playstyle model availability according to player identification information, player membership status, paid feature criteria, sharing permissions (e.g., sharing permissions between players, sharing permissions granted by a player), etc. For example, the gaming system 100 may support the use of another player's playstyle model as a paid feature, as part of a reward system (e.g., player membership program), as part of a shared feature between players (e.g., based on sharing permissions, social media relationships, etc.). In some examples, the permissions information may indicate playstyle model availability according to game type and/or game theme.

Figure 3:
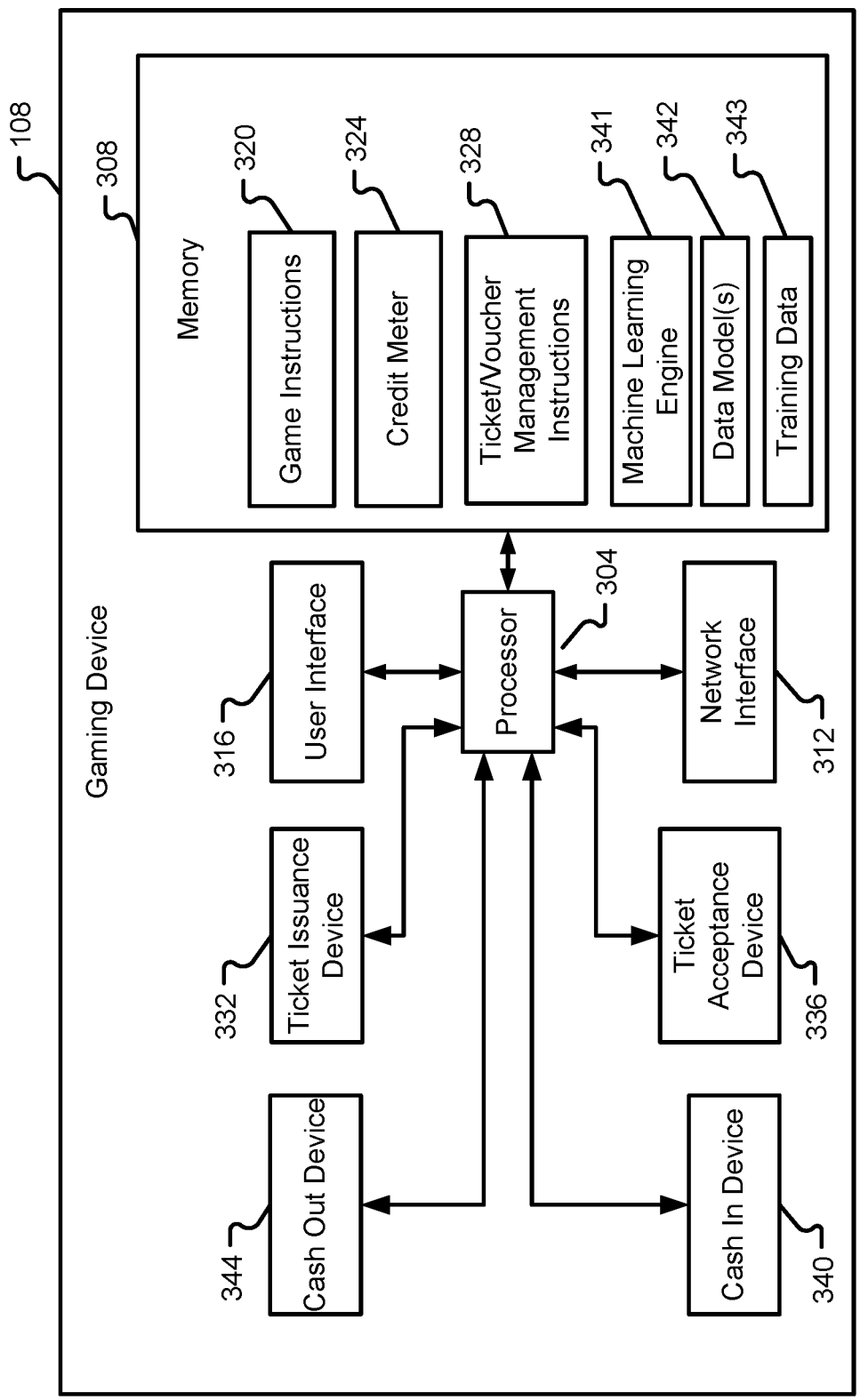
FIG. 3 is a block diagram of a gaming device in accordance with aspects of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a mobile device 144 described herein without departing from the scope of the present disclosure.

The gaming device 108 is depicted to include a processor 304, memory 308, a network interface 312, a user interface 316, a ticket issuance device 332, a ticket acceptance device 336, a cash-in device 340, and a cash out device 344. In some embodiments, the processor 304 may include example aspects of the processor 120. In other words, the processor 304 may correspond to one or many microprocessors, CPUs, microcontrollers, or the like. The processor 304 may be configured to execute one or more instruction sets stored in memory 308.

The network interface 312 may include example aspects of network interface 128. The nature of the network interface 312, however, may depend upon whether the network interface 312 is provided in a gaming device 108 or a communication device 144. Examples of a network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle," a speaker, or combinations thereof. If the gaming device 108 is a digital device, then the user interface 316 may include one or more touch-sensitive displays, LED/LCD display screens, etc. In some cases, the user interface 316 may include a combination of a physical interface (e.g., mechanical reels, depressible buttons, a lever, etc.) and other user interfaces (e.g., touch-sensitive displays, LED/LCD display screens, etc.). In some cases, the user interface 316 may include a biometric scanning device (e.g., a fingerprint scanner) supportive of biometric inputs by a user. In some examples, the user interface 316 may include any combination of sensors 145 described with reference to FIG. 1 (e.g., an image sensor, an eye tracking sensor, a heart rate sensor, an infrared sensor, an audio sensor, a pulse sensor, an oxygen sensor, a temperature sensor, a pressure sensor, a touch screen sensor, a vibration sensor, a motion sensor, an accelerometer, etc.).

In some examples, the user interface 316 may include an interface for implementing an auto play mode described herein. For example, the user interface 316 may support the selection of a playstyle model and the invoking of an auto play mode based on the playstyle model. In some other examples, the user interface 316 may support a playstyle-based "Bet" button described herein.

The memory 308 may include example aspects of memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the gaming server 116. Examples of instruction sets that may be stored in the memory 308 include a game instruction set 320, a credit meter 324, and a ticket/voucher management instruction set 328.

In some embodiments, the game instruction set 320, when executed by the processor 304, may enable the gaming device 108 to facilitate one or more games of chance or skill and produce interactions between the player 112 and the game of chance or skill. In some embodiments, the game instruction set 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their communication device 144, and any other subroutine or set of instructions that facilitate gameplay at or in association with the gaming device 108.

In some aspects, the game instruction set 320, when executed by the processor 304, may enable the gaming device 108 to facilitate interactions between the player in association with invoking an auto play mode of the gaming device 108. In an example, the game instruction set 320 may include subroutines that present, via the user interface 316, a menu or notifications associated with aspects described herein for setting and/or viewing parameters of an auto play mode for a gaming device 108, invoking the auto play mode at the gaming device 108, pausing the auto play mode, bypassing the auto play mode, and/or terminating the auto play mode. In some examples, the game instruction set 320 may include subroutines that present the menu or notifications via a communication device 144. In some examples, the game instruction set 320 may include subroutines that present, via the user interface 316, a menu or notifications associated with aspects described herein for confirming gameplay performance of an auto play mode (e.g., providing feedback for confirming gameplay performance of a playstyle model applied to the auto play mode).

The credit meter 324 may correspond to a secure instruction set and/or data structure within the gaming device 108 that facilitates a tracking of activity at the gaming device 108. In some embodiments, the credit meter 324 may be used to store or log information related to various activities of a player 112 and events that occur at the gaming device 108. The types of information that may be maintained in the credit meter 324 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108.

In some embodiments, the credit meter 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 324 may be updated in response to outcomes of a game of chance or skill played at the gaming device 108. In some embodiments, the credit meter 324 may be updated depending upon whether the gaming device 108 is issuing a ticket/voucher, being used as a point of redemption for a ticket/voucher, and/or any other activity associated with a ticket/voucher. Some or all of the data within the credit meter 324 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

Activities of the gaming device 108 related to ticket/voucher activity may be managed and reported by the ticket/voucher management instruction set 328. In some embodiments, when a ticket/voucher is redeemed at the gaming device 108 by the player 112, information associated with the ticket/voucher may be obtained by the ticket/voucher management instruction set 328 and reported to the gaming server 116. Furthermore, the ticket/voucher management instruction set 328 may be configured to update the credit meter 324 if the redeemed ticket/voucher is determined to be in a redeemable state and has a redeemable or redemption value associated therewith. In some embodiments, the credit meter 324 may be updated or incremented by the redeemable or redemption value of the ticket/voucher when redeemed. This information may be obtained directly from the ticket/voucher or may include some interactions (e.g., verification operations) with the gaming server 116 prior to updating the credit meter 324.

The gaming device 108 may be provided with appropriate hardware to facilitate acceptance and issuance of tickets/vouchers. Specifically, the gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a non-visual scanning device (e.g., an RFID reader, an NFC reader), a physical ticket acceptor, a shredder, etc. The ticket acceptance device 336 may be configured to accept physical tickets and/or electronic tickets without departing from the scope of the present disclosure. An electronic ticket/voucher may be accepted by scanning a visual code (e.g., a one-dimensional barcode, a two-dimensional barcode, any other type of barcode, a quick response (QR) code, etc.) displayed on a printed ticket/voucher or a communication device 144, for example. In another example, an electronic ticket/voucher may be accepted by scanning a tag (e.g., an RFID tag, an NFC tag, a contactless smart card, or the like) storing the ticket/voucher information.

The ticket issuance device 332 may be configured to print or provide physical tickets/vouchers to players 112. In some embodiments, the ticket issuance device 332 may be configured to issue a ticket/voucher consistent with an amount of credit available to a player 112, possibly as indicated within the credit meter 324. In some cases, the ticket/voucher may be an e-TITO voucher including a reprogrammable electronic display and an RFID tag.

The cash-in device 340 may include a bill acceptor, a coin acceptor, a chip acceptor or reader, or the like. In some embodiments, the cash-in device 340 may also include credit card reader hardware and/or software. In some aspects, the cash-in device 340 may include one or more machine vision devices (e.g., a camera, IR scanner, optical scanner, barcode scanner, etc.) or non-visual scanning devices (e.g., an RFID reader/writer, an NFC reader/writer).

The cash-out device 344, like the ticket issuance device 322, may operate and issue cash, coins, tokens, or chips based on an amount indicated within the credit meter 324. In some embodiments, the cash-out device 344 may include a coin tray or the like and counting hardware configured to count and distribute an appropriate amount of coins or tokens based on a player's 112 winnings or available credit within the credit meter 324. In some aspects, the cash-out device 344 may include one or more machine vision devices or non-visual scanning devices.

The memory 308 may be configured to store instruction sets, neural networks, and other data structures (e.g., depicted herein) in addition to temporarily storing data for the processor 304 to execute various types of routines or functions. For example, the memory 308 may be configured to store program instructions (instruction sets) that are executable by the processor 304 and provide functionality of a machine learning engine 341 described herein. The machine learning engine 341 may include example aspects of the machine learning engine 141 described with reference to FIG. 1.

One example of data that may be stored in memory 308 for use by components thereof is a data model(s) 342 and/or training data 343. The data model(s) 342 and the training data 343 may include examples of aspects of the data model(s) 142 and the training data 143 described with reference to the gaming server 116. The gaming device 108 (e.g., the machine learning engine 341) may utilize one or more data models 342 for recognizing and processing information obtained by the gaming device 108, another gaming device 108, a server (e.g., the gaming server 116), communication devices 144, and/or a database (e.g., player profile database 148, ticket/voucher database 152, and/or gaming device database 154). In some aspects, the gaming device 108 (e.g., the machine learning engine 341) may update one or more data models 342 based on learned information included in the training data 343.

In some aspects, components of the machine learning engine 341 may be provided in a separate machine learning engine (e.g., at server, for example, the gaming server 116) in communication with the gaming device 108.

Figure 4:
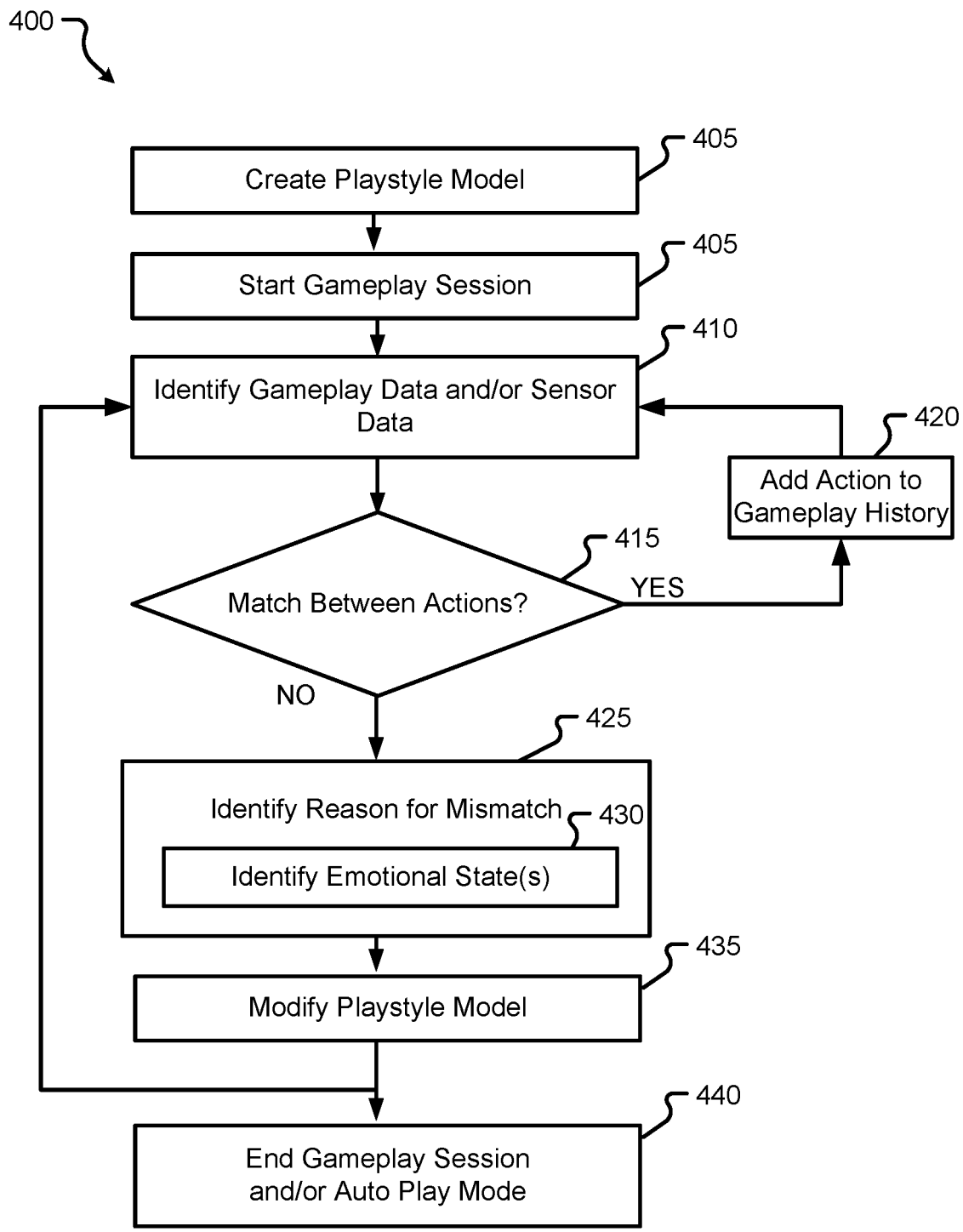
FIG. 4 is a process flow illustrating aspects of self-evolving, AI-based playstyle models in accordance with aspects of the present disclosure.

FIG. 4 illustrates an example of a process flow 400 that supports aspects of the present disclosure associated with generating, training, and applying self-evolving AI-based playstyle models described herein. The process flow 400 supports aspects of the present disclosure associated with a playstyle model applied to a gameplay session. In some examples, process flow 400 may implement aspects of gaming system 100. Further, process flow 400 may be implemented by a gaming system 100 or components included therein as described with reference to FIGS. 1 through 3.

In the following description of the process flow 400, the operations may be performed in a different order than the order shown, or the operations may be performed in different orders or at different times. Certain operations may also be left out of the process flow 400, or other operations may be added to the process flow 400. It is to be understood that any device (e.g., a gaming device 108, a gaming server 116, a communication device 144, components of the system 100, etc.) may perform the operations shown.

At 405, a gaming server 116 may create a playstyle model (e.g., a baseline playstyle model) based on previous actions (e.g., gameplay decisions) of a player and/or other players as described herein.

At 410, the gaming server 116 may identify a gameplay session initiated at a gaming device 108 (e.g., based on a "card in" event at the gaming device 108, based on a player 112 inserting credits into the gaming device 108, based on a first gameplay decision by the player 112, etc.). In an example, the gaming server 116 may apply the playstyle model to the gameplay session (e.g., automatically and/or based on a player selection).

At 415, during the gameplay session, the gaming server 116 may identify gameplay data (e.g., gameplay decisions, wager amounts, etc.) and/or sensor data (e.g., biometric data, etc.) associated with the gameplay session. In some aspects, at 415, the gaming server 116 may identify an emotional state(s) of the player using the sensor data.

At 415, the gaming server 116 may compare an action (e.g., a gameplay decision by a player in association with the gameplay session) to previous actions (also referred to herein as previous gameplay decisions) by the player. In some examples, at 420, the gaming server 116 may compare the action (e.g., gameplay decision) to an action predicted using the playstyle model (e.g., a predicted gameplay decision).

At 420, if the gaming server 116 identifies that that there is a match between the action and a previous action (e.g., the gameplay decision is the same as a previous decision(s) under similar gameplay conditions), the gaming server 116 may add the action to a history of previous gameplay decisions so as to establish and/or verify accuracy of the applied playstyle model with respect to the action. In some alternative or additional aspects, at 420, if the gaming server 116 identifies that that there is a match between the action and the action predicted by the gaming server (e.g., the gameplay decision is the same as a gameplay decision(s) predicted by the playstyle model), the gaming server 116 may add the action to the history of previous gameplay decisions.

At 425, if the gaming server 116 identifies that there is not a match between the action and the previous action (or identifies that there is not a match between the action and the action predicted by the playstyle model), the gaming server 116 (e.g., using machine learning engine 141) may identify the reason for the mismatch as described herein. For example, at 425 the gaming server 116 may identify whether the mismatch is a result of a spontaneous or non-rational decision by the player, a general behavioral shift of the player, etc.

In some aspects, the gaming server 116 (e.g., using an emotion prediction model) may identify (e.g., at 430) an emotional state(s) of the player based on the sensor data identified at 410. Accordingly, for example, at 425 the gaming server 116 may identify whether the mismatch between the action and the previous action (or between the action and the action predicted by the playstyle model) is due to a behavioral shift associated with changes in emotional state of the player.

At 435, the gaming server 116 may modify the playstyle model based on the behavioral changes. That is, for example, the gaming server may modify the playstyle model to account for the shift or change in emotional state of the player.

At 440, the gaming server 116 may end the gameplay session and/or end the auto play mode at the gaming device 108. For example, the gaming server 116 may end the gameplay session and/or end the auto play mode based on a player input (e.g., a player input for ending the gameplay session, a casino operator input for ending the gameplay session, a cash out event at the gaming device 108, a player input terminating the auto play mode, etc.). In some examples, at 440, the gaming server 116 may end the gameplay session based on a recommendation by the gaming server 116 as described herein.

Aspects of the process flow 400 may include continuous monitoring of the gaming system 100. In some aspects, the monitoring may be implemented at the gaming server 116. In some other aspects, the monitoring may be implemented by tracking system separate from the gaming server 116, and the tracking system may report results of monitoring the gaming system 100 to the gaming server 116.

Figure 5:
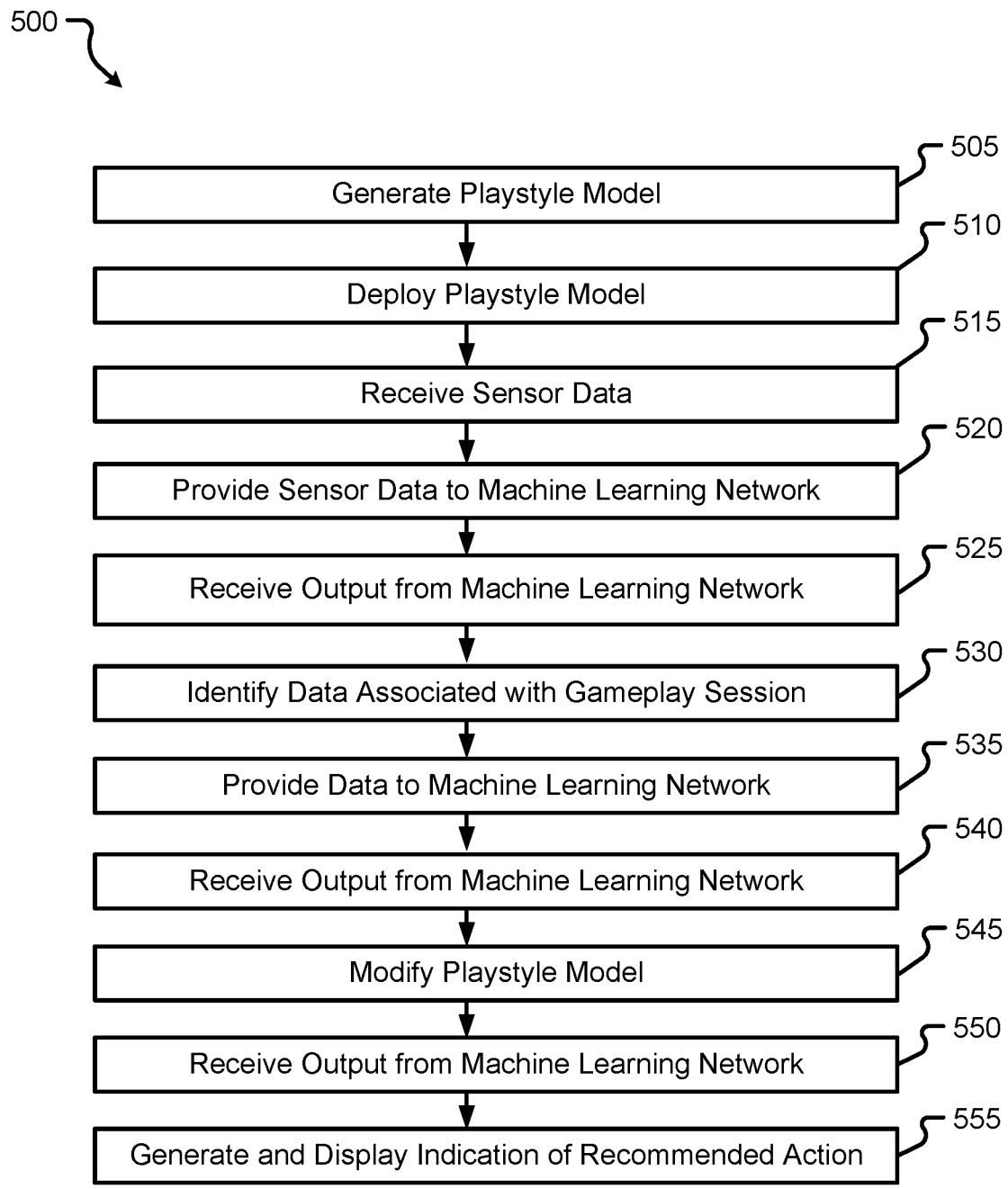
FIG. 5 is a process flow illustrating aspects of self-evolving, AI-based playstyle models in accordance with aspects of the present disclosure.

FIG. 5 illustrates an example of a process flow 500 that supports aspects of the present disclosure associated with generating, training, and applying self-evolving AI-based playstyle models described herein.

The process flow 500 supports aspects of the present disclosure associated with a playstyle model applied to a gameplay session. In some examples, process flow 500 may implement aspects of gaming system 100. Further, process flow 500 may be implemented by a gaming system 100 or components included therein as described with reference to FIGS. 1 through 3.

In the following description of the process flow 500, the operations may be performed in a different order than the order shown, or the operations may be performed in different orders or at different times. Certain operations may also be left out of the process flow 500, or other operations may be added to the process flow 500. It is to be understood that any device (e.g., a gaming device 108, a gaming server 116, a communication device 144, components of the system 100, etc.) may perform the operations shown.

At 505, the gaming server 116 may generate a playstyle model based on a set of previous gameplay decisions associated with a set of previous gameplay sessions. In some aspects, the set of previous gameplay sessions are associated with a first game type and a first gaming market.

In some aspects, the playstyle model may include a self-evolving model.

In some aspects, the playstyle model is generated based on: data associated with a set of previous gameplay sessions and at least one of the user and another user; and player feedback associated with a performance result of the playstyle model.

At 510, the gaming server 116 may deploy the playstyle model for a gameplay session at a gaming device.

In some aspects, the gameplay session is associated with: at least one game type of a set of game types; and at least one gaming market of a set of gaming markets. In some aspects, the set of game types may include the first game type and a second game type. In some aspects, the set of gaming markets may include the first gaming market and a second gaming market.

In some aspects, the gameplay session is associated with a game type of a set of game types, the set of game types including at least one of: a chance-based game type; and a skill-based game type.

At 515, the gaming server 116 may receive sensor data associated with the gameplay session. In some aspects, the sensor data is collected by at least one sensor of the gaming device.

In some aspects, the sensor data may include at least one of: biometric data of the user in association with the gameplay session; and a value corresponding to a force associated with at least one physical input by the user at the gaming device in association with the gameplay session.

In some aspects, the at least one sensor may include at least one of: an image sensor, an eye tracking sensor, a heart rate sensor, an infrared sensor, an audio sensor, a pulse sensor, an oxygen sensor, a pressure sensor, a touch screen sensor, a vibration sensor, a motion sensor, and a temperature sensor.

At 520, the gaming server 116 may provide the sensor data to the machine learning network.

At 525, the gaming server 116 may receive an output from the machine learning network in response to the machine learning network processing the sensor data using an emotion prediction model, the output including an emotional state of the user (e.g., in association with a gameplay decision, a decision event, etc.).

At 530, the gaming server 116 may identify data associated with the gameplay session at the gaming device. In some aspects, the data may include at least one of: a gameplay decision received during the gameplay session; and an emotional state of a user in association with the gameplay decision.

In some aspects, the data associated with the gameplay session may include at least one of: at least one other gameplay decision received during the gameplay session; and an emotional state of the user in association with the at least one other gameplay decision.

Additionally, or alternatively (not illustrated), the gaming server 116 may identify additional data associated with at least one other gameplay session. In some aspects, the additional data may include: at least one other gameplay decision received during the at least one other gameplay session; and a second emotional state of at least one user of a set of users. In some aspects, the set of users may include the user and another user. In some aspects, the second emotional state is associated with the at least one other gameplay decision.

At 535, the gaming server 116 may provide the data (and/or the additional data) to a machine learning network.

At 540, the gaming server 116 may receive an output from the machine learning network in response to the machine learning network processing the data using the playstyle model. In some aspects, the output from the machine learning network is received in response to the machine learning network processing the additional data using the playstyle model. In some aspects, the output may include an indication associated with modifying the playstyle model.

In some aspects, the playstyle model may include a decision model associated with a set of gameplay parameters; and the output from the machine learning network may include an indication associated with modifying the decision model.

At 545, the gaming server 116 may modify the playstyle model based on the indication associated with modifying the playstyle model. In an example, the gaming server 116 may modify the playstyle model based on the indication associated with modifying the decision model).

In some aspects, the gameplay decision (included in the data identified at 530) is associated with a decision event, and receiving the output from the machine learning network (at 540) is in response to the machine learning network comparing, using the playstyle model, at least one of: the gameplay decision and a predicted gameplay decision associated with the decision event; and the emotional state and a predicted emotional state of the user in association with the predicted gameplay decision.

In some aspects, the gameplay decision (included in the data identified at 530) is associated with a decision event, and receiving the output from the machine learning network (at 540) is in response to the machine learning network determining at least one of: a deviation between the gameplay decision and a predicted gameplay decision; and a deviation between the emotional state and a predicted emotional state of the user. In some aspects, the predicted emotional state is associated with the predicted gameplay decision.

At 550, the gaming server 116 may receive a second output from the machine learning network in response to the machine learning network processing the data using the playstyle model. In some aspects, the second output may include a recommended action associated with the gameplay session.

At 555, the gaming server 116 may generate and display an indication of the recommended action. In some aspects, the indication is displayed by at least one of: the gaming device, a communication device of the user, and a communication device of a casino operator.

In some aspects, the recommended action may include at least one of: a proposed gameplay decision associated with the gameplay session; pausing the gameplay session; terminating the gameplay session; a proposed game type associated with the gameplay session; a proposed game type associated with a different gameplay session; a proposed gaming device associated with the gameplay session; a proposed gaming device associated with the different gameplay session; a proposed incentive associated with the user; and a proposed incentive associated with the gameplay session.

Example aspects (not illustrated) are described herein with respect to applying the modified playstyle model.

In an example, the gaming server 116 may identify additional data including at least one decision event. In some aspects, the at least one decision event is associated with at least one of the gameplay session at the gaming device and another gameplay session at another gaming device. The gaming server 116 may provide the additional data to the machine learning network; and receive a second output from the machine learning network in response to the machine learning network processing the additional data using the modified playstyle model. In some aspects, the second output may include at least one of: at least one proposed gameplay decision associated with the at least one decision event; and at least one predicted emotional state of the user in association with the at least one proposed gameplay decision.

In another example, the gaming server 116 may identify additional data including a gameplay result associated with at least one proposed gameplay decision provided by the machine learning network; provide the additional data to the machine learning network; and receive a second output from the machine learning network in response to the machine learning network processing the additional data using the modified playstyle model and an emotion prediction model. In some aspects, the second output may include a predicted emotional state of the user in association with the gameplay result.

In another example, the gaming server 116 may receive a second output from the machine learning network, the second output including a predicted emotional state of the user in association with a gameplay result; and receive a third output from the machine learning network in response to the machine learning network processing the second output using the modified playstyle model and an emotion prediction model. In some aspects, the third output may include a first ranking associated with the gaming device and a second ranking associated with the other gaming device.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A system comprising:
   a communication interface;
   a processor coupled with the communication interface; and
   a computer-readable storage medium coupled with the processor, the computer-readable storage medium comprising processor-executable instructions that, when executed by the processor, cause the processor to:
   generate a playstyle model based at least in part on a set of previous gameplay decisions associated with a set of previous gameplay sessions, wherein the set of previous gameplay sessions are associated with a first game type and a first gaming market; and
   deploy the playstyle model for a gameplay session, wherein the gameplay session is associated with:
   at least one game type of a set of game types, wherein the set of game types comprises the first game type and a second game type; and
   at least one gaming market of a set of gaming markets, wherein the set of gaming markets comprises the first gaming market and a second gaming market;
   identify data associated with the gameplay session at a gaming device, the data comprising at least one of:
   a gameplay decision received during the gameplay session; and
   a state of a user in association with the gameplay decision;
   provide the data to a machine learning network;
   receive an output from the machine learning network in response to the machine learning network processing the data using the playstyle model, the output comprising an indication associated with modifying the playstyle model; and
   modify the playstyle model based at least in part on the indication.

2. The system of claim 1, wherein the playstyle model comprises a self-evolving model.

3. The system of claim 1, wherein the gameplay session is associated with a game type of a set of game types, the set of game types including at least one of:
   a chance-based game type; and
   a skill-based game type.

4. The system of claim 1, wherein:
the playstyle model comprises a decision model associated with a set of gameplay parameters; and
the output from the machine learning network comprises an indication associated with modifying the decision model.

5. The system of claim 1, wherein the data associated with the gameplay session comprises at least one of:
at least one other gameplay decision received during the gameplay session; and
the state of the user in association with the at least one other gameplay decision.

6. The system of claim 1, wherein the instructions are further executable by the processor to:
identify additional data associated with at least one other gameplay session, wherein the additional data comprises:
at least one other gameplay decision received during the at least one other gameplay session; and
a second state of at least one user of a set of users, wherein the set of users comprises the user and another user, wherein the second state is associated with the at least one other gameplay decision, wherein the output from the machine learning network is received in response to the machine learning network processing the additional data using the playstyle model.

7. The system of claim 1, wherein:
the gameplay decision is associated with a decision event; and
receiving the output from the machine learning network is in response to the machine learning network comparing, using the playstyle model, at least one of:
the gameplay decision and a predicted gameplay decision associated with the decision event; and
the state and a predicted state of the user in association with the predicted gameplay decision.

8. The system of claim 1, wherein:
the gameplay decision is associated with a decision event; and
receiving the output from the machine learning network is in response to the machine learning network determining at least one of:
a deviation between the gameplay decision and a predicted gameplay decision; and
a deviation between the state and a predicted state of the user, wherein the predicted state is associated with the predicted gameplay decision.

9. The system of claim 1, wherein the instructions are further executable by the processor to:
receive a second output from the machine learning network in response to the machine learning network processing the data using the playstyle model, wherein the second output comprises a recommended action associated with the gameplay session; and
generate and display an indication of the recommended action, wherein the indication is displayed by at least one of: the gaming device, a communication device of the user, and a communication device of a casino operator.

10. The system of claim 9, wherein the recommended action comprises at least one of:
a proposed gameplay decision associated with the gameplay session;
pausing the gameplay session;
terminating the gameplay session;
a proposed game type associated with the gameplay session;
a proposed game type associated with a different gameplay session;
a proposed gaming device associated with the gameplay session;
a proposed gaming device associated with the different gameplay session;
a proposed incentive associated with the user; and
a proposed incentive associated with the gameplay session.

11. The system of claim 1, wherein the instructions are further executable by the processor to:
identify additional data comprising at least one decision event, wherein the at least one decision event is associated with at least one of the gameplay session at the gaming device and another gameplay session at another gaming device;
provide the additional data to the machine learning network; and
receive a second output from the machine learning network in response to the machine learning network processing the additional data using the modified playstyle model, wherein the second output comprises at least one of:
at least one proposed gameplay decision associated with the at least one decision event; and
at least one predicted state of the user in association with the at least one proposed gameplay decision.

12. The system of claim 1, wherein the instructions are further executable by the processor to:
identify additional data comprising a gameplay result associated with at least one proposed gameplay decision provided by the machine learning network;
provide the additional data to the machine learning network; and
receive a second output from the machine learning network in response to the machine learning network processing the additional data using the modified playstyle model and a state prediction model, wherein the second output comprises a predicted state of the user in association with the gameplay result.

13. The system of claim 1, wherein the instructions are further executable by the processor to:
receive a second output from the machine learning network, the second output comprising a predicted state of the user in association with a gameplay result; and
receive a third output from the machine learning network in response to the machine learning network processing the second output using the modified playstyle model and state prediction model, wherein the third output comprises a first ranking associated with the gaming device and a second ranking associated with the other gaming device.

14. The system of claim 1, wherein the instructions are further executable by the processor to:
receive sensor data associated with the gameplay session, wherein the sensor data is collected by at least one sensor of the gaming device;
provide the sensor data to the machine learning network; and
receive a second output from the machine learning network in response to the machine learning network processing the sensor data using a state prediction model, the output comprising the state of the user.

15. The system of claim 14, wherein the sensor data comprises at least one of:
   biometric data of the user in association with the gameplay session; and
   a value corresponding to a force associated with at least one physical input by the user at the gaming device in association with the gameplay session.

16. The system of claim 14, wherein the at least one sensor comprises at least one of: an image sensor, an eye tracking sensor, a heart rate sensor, an infrared sensor, an audio sensor, a pulse sensor, an oxygen sensor, a pressure sensor, a touch screen sensor, a vibration sensor, a motion sensor, and a temperature sensor.

17. The system of claim 1, wherein the playstyle model is generated based at least in part on:
   data associated with a set of previous gameplay sessions and at least one of the user and another user; and
   player feedback associated with a performance result of the playstyle model.

18. A device comprising:
   a communication interface;
   a processor coupled with the communication interface; and
   a computer-readable storage medium coupled with the processor, the computer-readable storage medium comprising processor-executable instructions that, when executed by the processor, cause the processor to:
      generate a playstyle model based at least in part on a set of previous gameplay decisions associated with a set of previous gameplay sessions, wherein the set of previous gameplay sessions are associated with a first game type and a first gaming market; and
      deploy the playstyle model for a gameplay session, wherein the gameplay session is associated with:
         at least one game type of a set of game types, wherein the set of game types comprises the first game type and a second game type; and
         at least one gaming market of a set of gaming markets, wherein the set of gaming markets comprises the first gaming market and a second gaming market;
      identify data associated with the gameplay session at a gaming device, the data comprising at least one of:
         a gameplay decision received during the gameplay session; and
         a state of a user in association with the gameplay decision;
      provide the data to a machine learning network;
      receive an output from the machine learning network in response to the machine learning network processing the data using the playstyle model, the output comprising an indication associated with modifying the playstyle model; and
      modify the playstyle model based at least in part on the indication.

19. A method comprising:
   generating a playstyle model based at least in part on a set of previous gameplay decisions associated with a set of previous gameplay sessions, wherein the set of previous gameplay sessions are associated with a first game type and a first gaming market;
   deploying the playstyle model for a gameplay session, wherein the gameplay session is associated with:
      at least one game type of a set of game types, wherein the set of game types comprises the first game type and a second game type; and
      at least one gaming market of a set of gaming markets, wherein the set of gaming markets comprises the first gaming market and a second gaming market;
   identifying data associated with the gameplay session at a gaming device, the data comprising at least one of:
      a gameplay decision received during the gameplay session; and
      a state of a user in association with the gameplay decision;
   providing the data to a machine learning network;
   receiving an output from the machine learning network in response to the machine learning network processing the data using the playstyle model, the output comprising an indication associated with modifying the playstyle model; and
   modifying the playstyle model based at least in part on the indication.

* * * * *